US010975237B1

(12) United States Patent
Lin et al.

(10) Patent No.: US 10,975,237 B1
(45) Date of Patent: Apr. 13, 2021

(54) MELAMINE-FORMALDEHYDE RESIN COMPOSITION AND ITS PRODUCT

(71) Applicant: Chang Chun Plastics Co., Ltd., Taipei (TW)

(72) Inventors: Pin-Cheng Lin, Taipei (TW); Kuo-Pin Wu, Taipei (TW); I-Chiang Lai, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 15/930,825

(22) Filed: May 13, 2020

(30) Foreign Application Priority Data

Mar. 18, 2020 (TW) .................. 109108983

(51) Int. Cl.
*C08L 61/28* (2006.01)
(52) U.S. Cl.
CPC ........... *C08L 61/28* (2013.01); *C08L 2201/02* (2013.01); *C08L 2201/08* (2013.01)
(58) Field of Classification Search
CPC ...................................................... C08L 61/26
See application file for complete search history.

(56) References Cited

U.S. PATENT DOCUMENTS

| | | | | |
|---|---|---|---|---|
| 2,763,649 A | * | 9/1956 | Albrecht et al. ..... | C07D 251/70 544/196 |
| 3,322,762 A | * | 5/1967 | Alden .................. | C07D 251/70 544/196 |
| 4,101,520 A | * | 7/1978 | Boldizar ................ | C08G 12/32 524/512 |
| 4,183,832 A | * | 1/1980 | Meunier ................ | C03C 25/34 523/344 |
| 4,408,045 A | * | 10/1983 | Dobramysl .......... | C07D 251/64 544/196 |

(Continued)

FOREIGN PATENT DOCUMENTS

| | | |
|---|---|---|
| CN | 104829797 | 8/2015 |
| CN | 106432658 | 8/2018 |

(Continued)

OTHER PUBLICATIONS

Taiwan Examination Report, TW application No. 109108983 dated Sep. 28, 2020.

*Primary Examiner* — Liam J Heincer
(74) *Attorney, Agent, or Firm* — WPAT, PC

(57) ABSTRACT

Provided is a melamine-formaldehyde resin composition. In a first aspect, the melamine-formaldehyde resin composition has at least one melamine oligomer with a mass-to-charge ratio (m/z) ranging from 393 to 692. Based on the total area of all chromatographic peaks in the melamine-formaldehyde resin composition, the sum of the areas of the chromatographic peaks with m/z of 393 to 692 ranges from 2% to 20%. In a second aspect, the melamine-formaldehyde resin composition comprises 2,4,6-tri[bis(methoxymethyl) amino]-1,3,5-triazine, and the area thereof ranges from 15% to 33% based on the total area of all chromatographic peaks in the melamine-formaldehyde resin composition. The melamine-formaldehyde resin composition of the present invention has superior freeze resistance and extended low-temperature storage life.

22 Claims, 12 Drawing Sheets

(56) References Cited

U.S. PATENT DOCUMENTS

| | | | | |
|---|---|---|---|---|
| 4,425,466 | A | * | 1/1984 | Santer .................. C08G 12/427 524/512 |
| 5,380,815 | A | * | 1/1995 | Cipolli .................. C08G 12/30 524/100 |
| 5,717,053 | A | * | 2/1998 | Inui ........................ C08G 8/24 528/87 |
| 2018/0169603 | A1 | * | 6/2018 | Harrison .............. C08G 12/428 |
| 2018/0371200 | A1 | * | 12/2018 | Torres .................... B01D 65/02 |

FOREIGN PATENT DOCUMENTS

| | | |
|---|---|---|
| CN | 107382889 | 3/2019 |
| TW | 200502270 | 1/2005 |

* cited by examiner

MELAMINE-FORMALDEHYDE RESIN COMPOSITION AND ITS PRODUCT

CROSS-REFERENCE TO RELATED APPLICATION

Pursuant to 35 U.S.C. § 119(a), this application claims the benefit of the priority to Taiwan Patent Application No. 109108983 filed on Mar. 18, 2020. The content of the prior application is incorporated herein by its entirety.

BACKGROUND OF THE INVENTION

1. Field of the Invention

The present invention relates to a resin composition and its product, particularly to a melamine-formaldehyde resin composition and a product comprising the melamine-formaldehyde resin composition.

2. Description of the Prior Arts

Melamine-formaldehyde resin (MF) is a synthetic resin obtained by the addition reaction of melamine and formaldehyde. Characterized by good flame retardancy, heat resistance, water resistance, solvent resistance, insulation, and high hardness, the melamine-formaldehyde resin is often employed to manufacture daily products such as fire-resistant construction materials, fabrics, plastics, metal plates, coating materials, etc. The common melamine tableware is made of the melamine-formaldehyde resin.

However, the characteristics of the melamine-formaldehyde resin produced by the aforementioned method are easily affected by external environmental temperature. The lower the environmental temperature is, the stickier the melamine-formaldehyde resin becomes. In addition, the current melamine-formaldehyde resin is prone to freeze at a low environmental temperature. This phenomenon not only significantly shortens the storage life of the melamine-formaldehyde resin but also restricts operability and processability thereof, resulting in inconvenience for MF manufacturers and processors.

In view of problems that the current melamine-formaldehyde resin tends to freeze and have insufficient storage life at low temperatures, a melamine-formaldehyde resin with excellent freeze resistance needs to be soon developed, so the inconvenience and the use limitations caused by easy freezing of the current melamine-formaldehyde resin in low-temperature environments can be solved.

SUMMARY OF THE INVENTION

In view of this, the objectives of the present invention are to prolong the low-temperature storage life and improve the freeze resistance of the melamine-formaldehyde resin composition.

In order to achieve the above objectives, a first aspect of the present invention provides a melamine-formaldehyde resin composition, which comprises at least one melamine oligomer. The melamine-formaldehyde resin composition is analyzed by Liquid Chromatography-Mass Spectrometry (LC-MS), obtaining that the mass-to-charge ratio (m/z) of the at least one melamine oligomer may range from 393 to 692. Based on the total area of all chromatographic peaks in the melamine-formaldehyde resin composition, the sum of the areas of the chromatographic peaks with m/z of 393 to 692 may range from 2% to 20%.

According to the technical means of the first aspect of the present invention, by properly controlling the areas of the chromatographic peaks with m/z of 393 to 692 relative to the total areas of all chromatographic peaks in the melamine-formaldehyde resin composition, the melamine-formaldehyde resin composition of the present invention does have excellent freeze resistance and can be stored in low-temperature environments for a prolonged period without formation of crystals, i.e., the low-temperature storage life of the melamine-formaldehyde resin composition is extended. Therefore, the technical means of the first aspect of the present invention can solve the inconvenience and the use limitations caused by freezing of the conventional melamine-formaldehyde resin in low-temperature environments.

According to the technical means of the first aspect of the present invention, in one embodiment, based on the total area of all chromatographic peaks in the melamine-formaldehyde resin composition, the sum of the areas of the chromatographic peaks with m/z of 393 to 692 may range from 2% to 19%, 2% to 18%, or 5% to 15%. Preferably, based on the total area of all chromatographic peaks in the melamine-formaldehyde resin composition, the sum of the areas of the chromatographic peaks with m/z of 393 to 692 may range from 7% to 20%, so that the melamine-formaldehyde resin composition can have prolonged low-temperature storage life and improved freeze resistance.

According to the technical means of the first aspect of the present invention, the at least one melamine oligomer has a structure represented by the following Formula (I):

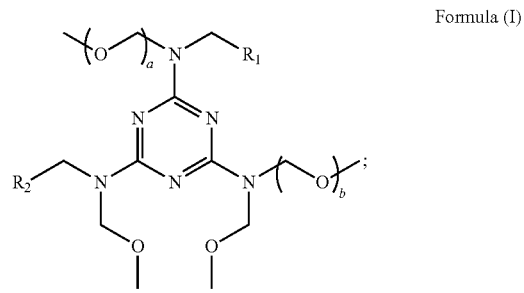

Formula (I)

wherein a may be an integer from 2 to 6, b may be an integer from 1 to 6, $R_1$ and $R_2$ each may be independently a hydroxyl group or a methoxy group, and a and b may be the same or different integers.

For example, the at least one melamine oligomer may have at least one of the structures represented by the following Formula (II) to Formula (V):

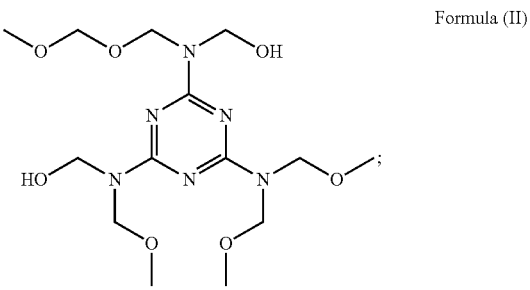

Formula (II)

-continued
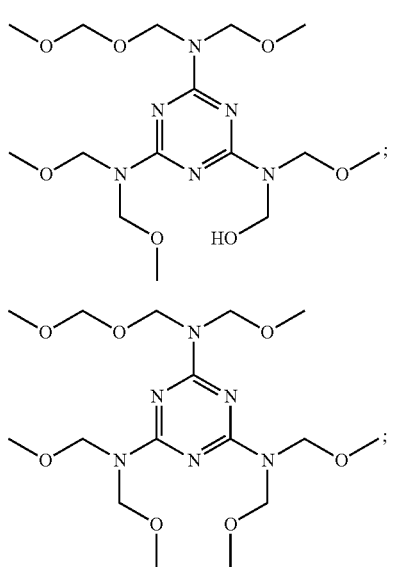
Formula (III)
Formula (IV)
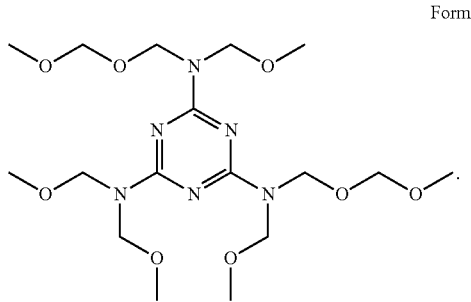
Formula (V)
In other embodiments, in addition to the structures represented by the aforementioned Formula (II) to Formula (V), the at least one melamine oligomer may also comprise, but not limited to, structures represented by the following:
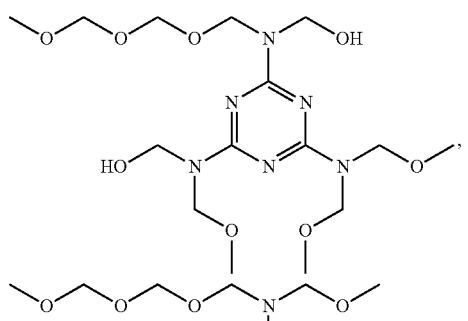
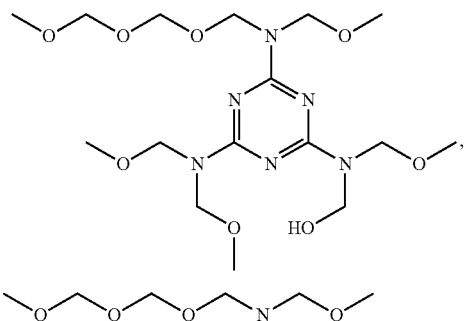
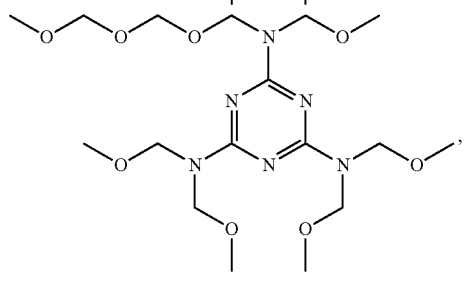
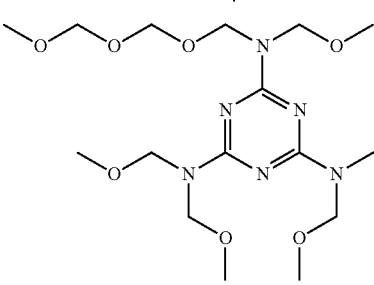
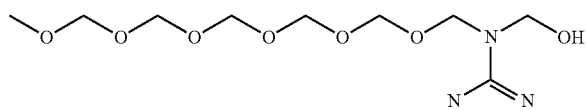
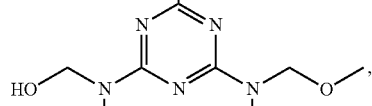
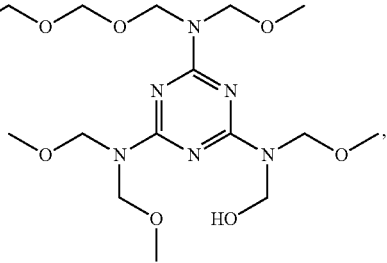

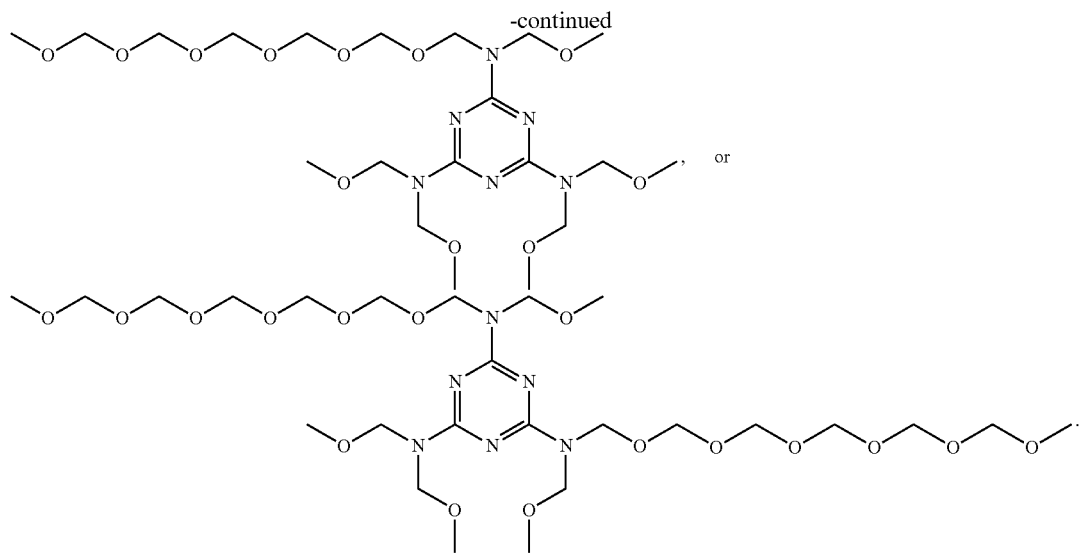

The m/z of the melamine oligomers which have structures represented by the above Formula (II) to Formula (V) and/or have the eight structures listed in the other embodiments may fall within the range from 393 to 692. The melamine oligomer may have an asymmetric structure. In some embodiments, a and b may be different integers.

According to the technical means of the first aspect of the present invention, preferably, the m/z of the at least one melamine oligomer having structures represented by the above Formula (II) to Formula (V) may range from 393 to 452. In one embodiment, based on the total area of all chromatographic peaks in the melamine-formaldehyde resin composition, the sum of the areas of the chromatographic peaks with m/z of 393 to 452 may range from 5% to 15%, 5% to 12%, or 5% to 10%. Preferably, based on the total area of all chromatographic peaks in the melamine-formaldehyde resin composition, the sum of the areas of the chromatographic peaks with m/z of 393 to 452 may range from 7% to 12%, so that the melamine-formaldehyde resin composition can have prolonged low-temperature storage life and improved freeze resistance.

In some embodiments, based on the total area of all chromatographic peaks in the melamine-formaldehyde resin composition, the sum of the areas of the chromatographic peaks with m/z of 393 to 452 may range from 5% to 8%. In some embodiments, based on the total area of all chromatographic peaks in the melamine-formaldehyde resin composition, the sum of the areas of the chromatographic peaks with m/z of 393 to 452 may range from 8.2% to 12%, further, from 8.4% to 12%.

According to the technical means of the first aspect of the present invention, in addition to the above-mentioned at least one melamine oligomer, the melamine-formaldehyde resin composition may further comprise the component represented by the following Formula (VI):

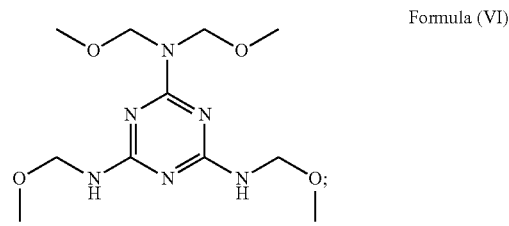 [SMILES: COCNc1nc(NCOC)nc(N(COC)COC)n1]

Formula (VI)

wherein the m/z of the component represented by the Formula (VI) may range from 300 to 310. Based on the total area of all chromatographic peaks in the melamine-formaldehyde resin composition, the area of the chromatographic peak with m/z of 300 to 310 may range from 1.15% to 2.50%. In one embodiment, based on the total area of all chromatographic peaks in the melamine-formaldehyde resin composition, the area of the chromatographic peak with m/z of 300 to 310 may range from 1.15% to 2.40%. In another embodiment, based on the total area of all chromatographic peaks in the melamine-formaldehyde resin composition, the area of the chromatographic peak with m/z of 300 to 310 may range from 1.15% to 2.20%.

According to the technical means of the first aspect of the present invention, in addition to the aforementioned at least one melamine oligomer, the melamine-formaldehyde resin composition may further comprise the component represented by the following Formula (VII):

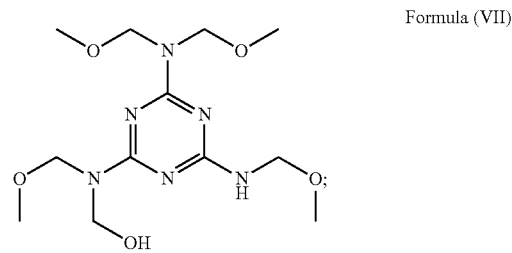 [SMILES: COCNc1nc(N(CO)COC)nc(N(COC)COC)n1]

Formula (VII)

wherein the m/z of the component represented by the Formula (VII) may range from 330 to 340. Based on the total area of all chromatographic peaks in the melamine-formaldehyde resin composition, the sum of the areas of the chromatographic peaks with m/z of 300 to 310 and 330 to 340 may range from 1.8% to 5.0%, further from 1.8% to 4.8%. Preferably, based on the total area of all chromatographic peaks in the melamine-formaldehyde resin composition, the sum of the areas of the chromatographic peaks with m/z of 300 to 310 and 330 to 340 may fall within the range from 1.80% to 1.97% or from 2.10% to 4.60%, so that the melamine-formaldehyde resin composition can have prolonged low-temperature storage life and improved freeze resistance.

According to the technical means of the first aspect of the present invention, in addition to the aforementioned at least one melamine oligomer, the melamine-formaldehyde resin composition may further comprise 2,4,6-tri[bis(methoxymethyl)amino]-1,3,5-triazine represented by the following Formula (VIII):

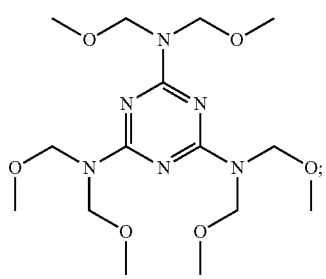

Formula (VIII)

based on the total area of all chromatographic peaks in the melamine-formaldehyde resin composition, the area of the chromatographic peak of 2,4,6-tri[bis(methoxymethyl)amino]-1,3,5-triazine may range from 15% to 33%, 15% to 31%, 15% to 30%, or 15% to 28%.

In one embodiment, based on the total area of all chromatographic peaks in the melamine-formaldehyde resin composition, the area of the chromatographic peak of 2,4,6-tri[bis(methoxymethyl)amino]-1,3,5-triazine may range from 20% to 31%. Preferably, based on the total area of all chromatographic peaks in the melamine-formaldehyde resin composition, the area of the chromatographic peak of 2,4,6-tri[bis(methoxymethyl)amino]-1,3,5-triazine may fall within the range from 20% to 30%, 20% to 29%, 20% to 28%, or 20% to 27%, so that the melamine-formaldehyde resin composition can have prolonged low-temperature storage life and improved freeze resistance.

In some embodiments, based on the total area of all chromatographic peaks in the melamine-formaldehyde resin composition, the area of the chromatographic peak of 2,4,6-tri[bis(methoxymethyl)amino]-1,3,5-triazine may range from 20.0% to 27.8%. In some embodiments, based on the total area of all chromatographic peaks in the melamine-formaldehyde resin composition, the area of the chromatographic peak of 2,4,6-tri[bis(methoxymethyl)amino]-1,3,5-triazine may range from 28.5% to 30.0%.

In order to achieve the above objectives, a second aspect of the present invention provides a melamine-formaldehyde resin composition, which comprises 2,4,6-tri[bis(methoxymethyl)amino]-1,3,5-triazine represented by the above Formula (VIII). The melamine-formaldehyde resin composition is analyzed by LC-MS, obtaining that based on the total area of all chromatographic peaks in the melamine-formaldehyde resin composition, the area of the chromatographic peak of 2,4,6-tri[bis(methoxymethyl)amino]-1,3,5-triazine may range from 15% to 33%.

According to the technical means of the second aspect of the present invention, by properly controlling the ratio, i.e., the area of the chromatographic peak of 2,4,6-tri[bis(methoxymethyl)amino]-1,3,5-triazine relative to the total area of all chromatographic peaks in the melamine-formaldehyde resin composition, to be within the above range, the melamine-formaldehyde resin composition of the present invention does have excellent freeze resistance and can be stored in low-temperature environments for a prolonged period without formation of crystals, that is, the low-temperature storage life of the melamine-formaldehyde resin composition is extended. Therefore, the technical means of the second aspect of the present invention does solve the inconvenience and the use limitations caused by freezing of the conventional melamine-formaldehyde resin in low-temperature environments.

According to the technical means of the second aspect of the present invention, in one embodiment, based on the total area of all chromatographic peaks in the melamine-formaldehyde resin composition, the area of the chromatographic peak of 2,4,6-tri[bis(methoxymethyl)amino]-1,3,5-triazine may range from 15% to 31%, 15% to 30%, or 15% to 28%.

In one embodiment, based on the total area of all chromatographic peaks in the melamine-formaldehyde resin composition, the area of the chromatographic peak of 2,4,6-tri[bis(methoxymethyl)amino]-1,3,5-triazine may range from 20% to 31%. Preferably, based on the total area of all chromatographic peaks in the melamine-formaldehyde resin composition, the area of the chromatographic peak of 2,4,6-tri[bis(methoxymethyl)amino]-1,3,5-triazine may fall within the range from 20% to 30%, 20% to 29%, 20% to 28%, or 20% to 27%, so that the melamine-formaldehyde resin composition can have prolonged low-temperature storage life and improved freeze resistance.

In some embodiments, based on the total area of all chromatographic peaks in the melamine-formaldehyde resin composition, the area of the chromatographic peak of 2,4,6-tri[bis(methoxymethyl)amino]-1,3,5-triazine may range from 20.0% to 27.8%. In some embodiments, based on the total area of all chromatographic peaks in the melamine-formaldehyde resin composition, the area of the chromatographic peak of 2,4,6-tri[bis(methoxymethyl)amino]-1,3,5-triazine may range from 28.5% to 30.0%.

According to the technical means of the second aspect of the present invention, the melamine-formaldehyde resin composition further comprises at least one melamine oligomer, which may have the structure represented by the above Formula (I), wherein a may be an integer from 2 to 6, b may be an integer from 1 to 6, $R_1$ and $R_2$ each may be independently a hydroxyl group or a methoxy group, and a and b may be the same or different integers.

As described in the first aspect, the at least one melamine oligomer may have, but not limited to, structures represented by the above Formula (II) to Formula (V) and/or have the eight structures listed in the other embodiments. The m/z of the at least one melamine oligomer is 393 to 692, and based on the total area of all chromatographic peaks in the melamine-formaldehyde resin composition, the sum of the areas of the chromatographic peaks with m/z of 393 to 692 may range from 2% to 20%, 2% to 19%, 2% to 18%, or 5% to 15%. Preferably, based on the total area of all chromatographic peaks in the melamine-formaldehyde resin composition, the sum of the areas of the chromatographic peaks with m/z of 393 to 692 may range from 7% to 20%, so that the melamine-formaldehyde resin composition can have prolonged low-temperature storage life and improved freeze resistance.

According to the technical means of the second aspect of the present invention, the m/z of the at least one melamine oligomer may range from 393 to 452. In one embodiment, based on the total area of all chromatographic peaks in the melamine-formaldehyde resin composition, the sum of the areas of the chromatographic peaks with m/z of 393 to 452 may range from 5% to 15%, 5% to 12%, or 5% to 10%. Preferably, based on the total area of all chromatographic peaks in the melamine-formaldehyde resin composition, the sum of the areas of the chromatographic peaks with m/z of 393 to 452 may range from 7% to 12%, so that the melamine-formaldehyde resin composition can have prolonged low-temperature storage life and improved freeze resistance.

In some embodiments, based on the total area of all chromatographic peaks in the melamine-formaldehyde resin composition, the sum of the areas of the chromatographic peaks with m/z of 393 to 452 may range from 5% to 8%. In some embodiments, based on the total area of all chromatographic peaks in the melamine-formaldehyde resin composition, the sum of the areas of the chromatographic peaks with m/z of 393 to 452 may range from 8.2% to 12%, further from 8.4% to 12%.

According to the technical means of the second aspect of the present invention, the melamine-formaldehyde resin composition may further comprise the component represented by the above Formula (VI), wherein the m/z of the component represented by the Formula (VI) may range from 300 to 310. Based on the total area of all chromatographic peaks in the melamine-formaldehyde resin composition, the area of the chromatographic peak with m/z of 300 to 310 may range from 1.15% to 2.50%. In one embodiment, based on the total area of all chromatographic peaks in the melamine-formaldehyde resin composition, the area of the chromatographic peak with m/z of 300 to 310 may range from 1.15% to 2.40%. In another embodiment, based on the total area of all chromatographic peaks in the melamine-formaldehyde resin composition, the area of the chromatographic peak with m/z of 300 to 310 may range from 1.15% to 2.20%.

According to the technical means of the second aspect of the present invention, the melamine-formaldehyde resin composition may further comprise the component represented by the above Formula (VII), wherein the m/z of the component represented by the Formula (VII) may range from 330 to 340. Based on the total area of all chromatographic peaks in the melamine-formaldehyde resin composition, the sum of the areas of the chromatographic peaks with m/z of 300 to 310 and 330 to 340 may range from 1.8% to 5.0%, further from 1.8% to 4.8%. Preferably, based on the total area of all chromatographic peaks in the melamine-formaldehyde resin composition, the sum of the areas of the chromatographic peaks with m/z of 300 to 310 and 330 to 340 may fall within the range from 1.80% to 1.97% or from 2.10% to 4.60%, so that the melamine-formaldehyde resin composition can have prolonged low-temperature storage life and improved freeze resistance.

In the first and second aspects of the present invention, the melamine-formaldehyde resin composition not only comprises the aforementioned components but also may optionally comprise, but not limited to, other components such as the following components:

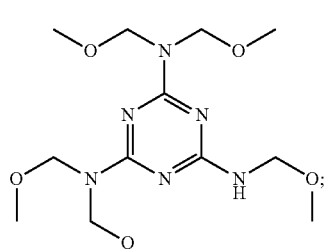

Formula (IX)

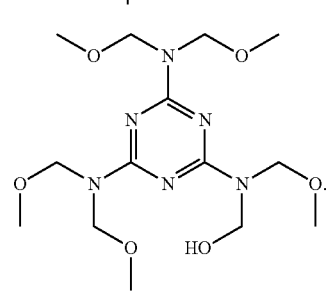

Formula (X)

In the specification, 2,4,6-tri[bis(methoxymethyl)amino]-1,3,5-triazine refers to fully etherified melamine-formaldehyde resin, also known as fully methylated melamine-formaldehyde resin. This fully etherified melamine-formaldehyde resin has a symmetric structure.

In the first and second aspects of the present invention, based on the total area of all chromatographic peaks in the melamine-formaldehyde resin composition, the sum of the areas of the chromatographic peaks with m/z of 393 to 692 may be, but is not limited to, any value of the following: e.g. 2%, 3%, 4%, 5%, 6%, 7%, 8%, 9%, 10%, 11%, 12%, 13%, 14%, 15%, 16%, 17%, 18%, 19%, and 20%. The aforesaid values may be each used as an end point of other ranges.

In the first and second aspects of the present invention, based on the total area of all chromatographic peaks in the melamine-formaldehyde resin composition, the sum of the areas of the chromatographic peaks with m/z of 393 to 452 may be, but is not limited to, any value of the following: e.g. 5%, 6%, 7%, 8%, 9%, 10%, 11%, 12%, 13%, 14%, and 15%. The aforesaid values may be each used as an end point of other ranges.

In the first and second aspects of the present invention, based on the total area of all chromatographic peaks in the melamine-formaldehyde resin composition, the area of the chromatographic peak with m/z of 300 to 310 may be, but is not limited to, any value of the following: e.g. 1.15%, 1.16%, 1.17%, 1.18%, 1.19%, 1.20%, 1.21%, 1.22%, 1.23%, 1.24%, 1.25%, 1.26%, 1.27%, 1.28%, 1.29%, 1.30%, 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48%, 1.49%, 1.50%, 1.51%, 1.52%, 1.53%, 1.54%, 1.55%, 1.56%, 1.57%, 1.58%, 1.59%, 1.60%, . . . 1.90%, 1.91%, 1.92%, 1.93%, 1.94%, 1.95%, 1.96%, 1.97%, 1.98%, 1.99%, 2.00%, 2.01%, 2.02%, 2.03%, 2.04%, 2.05%, 2.06%, 2.07%, 2.08%, 2.09%, 2.10%, 2.11%, 2.12%, 2.13%, 2.14%, 2.15%, 2.16%, 2.17%, 2.18%, 2.19%, 2.20%, 2.21%, 2.22%, 2.23%, 2.24%, 2.25%, 2.26%, 2.27%, 2.28%, 2.29%, 2.30%, 2.31%, 2.32%, 2.33%, 2.34%, 2.35%, 2.36%, 2.37%, 2.38% 2.39%, 2.40%, 2.41%, 2.42%, 2.43%, 2.44%, 2.45%, 2.46%, 2.47%, 2.48%, 2.49%, and 2.50%. The aforesaid values may be each used as an end point of other ranges.

In the first and second aspects of the present invention, based on the total area of all chromatographic peaks in the melamine-formaldehyde resin composition, the sum of the areas of the chromatographic peaks with m/z of 300 to 310 and 330 to 340 may be, but is not limited to, any value of the following: e.g. 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, and 5.0%. The aforesaid values may be each used as an end point of other ranges.

In the first and second aspects of the present invention, based on the total area of all chromatographic peaks in the melamine-formaldehyde resin composition, the area of the chromatographic peak of 2,4,6-tri[bis(methoxymethyl)amino]-1,3,5-triazine may be, but is not limited to, any value of the following: e.g. 15%, 16%, 17%, 18%, 19%, 20%, 21%, 22%, 23%, 24%, 25%, 26%, 27%, 28%, 29%, 30%, 31%, 32%, and 33%. The aforesaid values may be each used as an end point of other ranges.

In the structure represented by the above Formula (I) mentioned in the first and second aspects of the present invention, a may be any one of the integers 2, 3, 4, 5, and 6, and the aforesaid values may be each used as an end point of other ranges; b may be any one of the integers 1, 2, 3, 4, 5, and 6, and the aforesaid values may be each used as an end point of other ranges.

In this specification, the liquid chromatography is performed by employing a combination of gradient elution and isocratic elution for 90 minutes and using 30 percent by volume to 70 percent by volume of methanol aqueous solution as mobile phase. Preferably, the liquid chromatography is performed by employing gradient elution for initial 60 minutes and then isocratic elution for 30 minutes. For the initial gradient elution, the mobile phase gradually increases with concentration from 30 percent by volume of methanol aqueous solution into 70 percent by volume of methanol aqueous solution. For the later isocratic elution, the mobile phase remains constant with 70 percent by volume of methanol aqueous solution.

In this specification, "a low-temperature environment" refers to an environment with temperature that may be lower than room temperature or lower than zero Celsius degree. For example, the low-temperature environment may be an environment with temperature from −20° C. to 20° C., and may also refer to, but not limited to, 0° C. to 10° C., −20° C. to 0° C., −20° C. to −5° C., or −20° C. to −15° C.

In this specification, "being stored for a prolonged period" means the melamine-formaldehyde resin composition is able to be stored in a specific environment (such as a low-temperature environment) for a longer time than commercially available products are, and the melamine-formaldehyde resin composition maintains a liquid state without forming crystals during the storage time. Specifically, "being stored for a prolonged period" may refer to a storage time greater than 1 day, preferably greater than 4 days, more preferably greater than 1 week, or even more than 2 weeks.

In order to achieve the above objectives, the present invention further provides a melamine-formaldehyde resin product, which is formed by solidifying the melamine-formaldehyde resin composition of the first or second aspect of the present invention. According to the present invention, the melamine-formaldehyde resin composition of the first or second aspect of the present invention has superior freeze resistance and appropriate low-temperature storage life, which advantageously increase operability and processability of the melamine-formaldehyde resin, so the melamine-formaldehyde resin is suitable for making products in various application fields.

According to the present invention, the melamine-formaldehyde resin composition can be used as, but not limited to, e.g. inks, wood paints, automotive paints, water-based paints, etc. The melamine-formaldehyde resin products may be wood products, paper products, fiber products, ink products, or metal products (e.g. car paint, color steel plate or strip, pre-coated metal). Other objectives, advantages and novel features of the invention will become more apparent from the following detailed description when taken in conjunction with the accompanying drawings.

DETAILED DESCRIPTION OF THE PREFERRED EMBODIMENTS

Several examples are exemplified below to illustrate the implementations of the melamine-formaldehyde resin composition, while several comparative examples are provided as comparison. A person skilled in the art can easily realize the advantages and effects of the present invention from the following examples and comparative examples. The descriptions proposed herein are just preferable embodiments for the purpose of illustrations only, not intended to limit the scope of the present invention. Various modifications and variations could be made in order to practice or apply the present invention without departing from the spirit and scope of the invention.

《 Melamine-Formaldehyde Resin Compositions 》

Examples 1 to 7 (S1 to S7)

Figure 1:
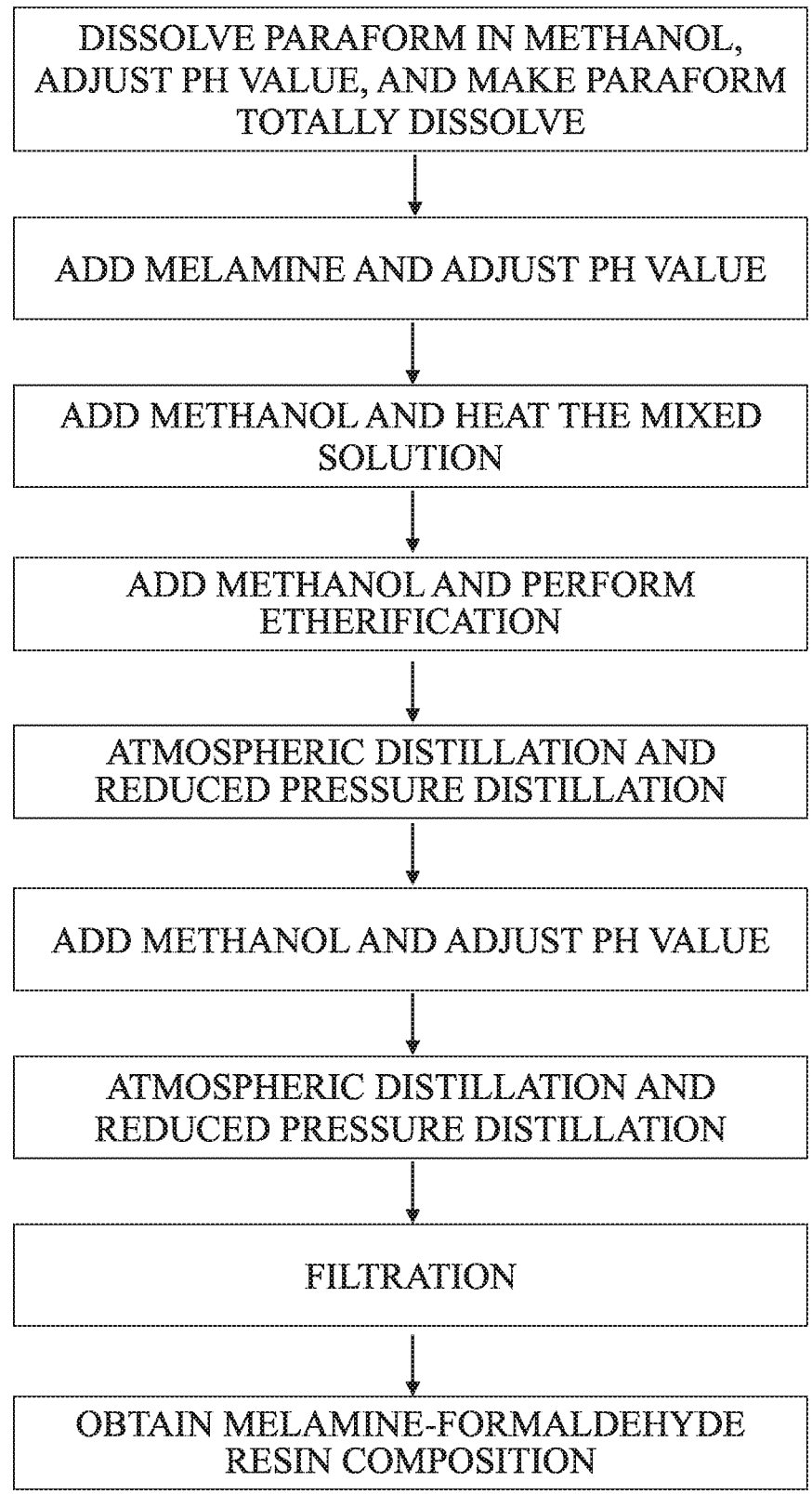
FIG. 1 is a schematic flowchart for producing the melamine-formaldehyde resin compositions of Examples 1 to 7.

As shown in FIG. 1, the melamine-formaldehyde resin compositions of Examples 1 to 7 were prepared as follows.

First, 238 grams (g) of paraform was weighed, and 171 g of methanol was added to the paraform, both of which were stirred to form a mixed solution. The pH value of the mixed solution was adjusted with sodium hydroxide to 10.5±0.5. The mixed solution was then heated to 50° C. to completely dissolve the paraform. At this time, the mixed solution was transparent.

Next, 106 g of melamine was added to the mixed solution in which the pH value thereof was readjusted to 10.5±0.5 by adding sodium hydroxide. 94 g of methanol was added, and then the mixed solution was heated to 70° C. and kept for 90 minutes.

After that, 65 g of methanol was added, and the mixed solution was processed with etherification for a period of time indicated in Table 1 below. Upon completing the etherification, the mixed solution was distilled under 760 torr and 98° C. and then distilled under reduced pressure of 80 torr and 105° C.

Subsequently, 270 g of methanol was added to the mixed solution in which the pH value thereof was adjusted by the addition of hydrochloric acid to 4.0±0.5 and maintained for 20 minutes. Then, the pH value of the mixed solution was adjusted to 9.5±0.5 by adding an appropriate amount of sodium hydroxide.

Thereafter, the mixed solution was distilled under 760 torr and 98° C. and then distilled under reduced pressure of 80 torr and 105° C. After 60 minutes, the solid residue was filtered to obtain the melamine-formaldehyde resin compositions of Examples 1 to 7.

Comparative Examples 1 to 3 (C1 to C3)

Figure 2:
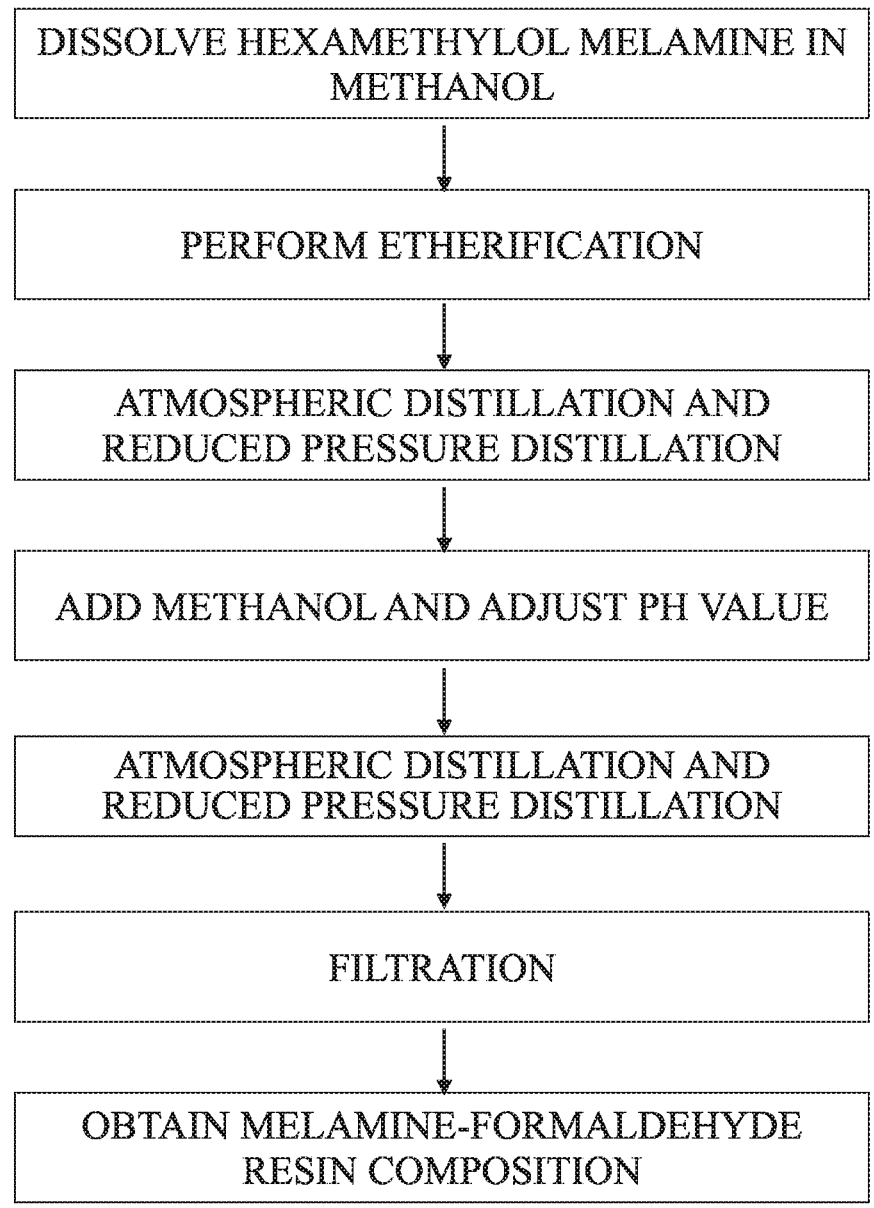
FIG. 2 is a schematic flowchart for producing the melamine-formaldehyde resin compositions of Comparative Examples 1 to 3.
Figure 3:
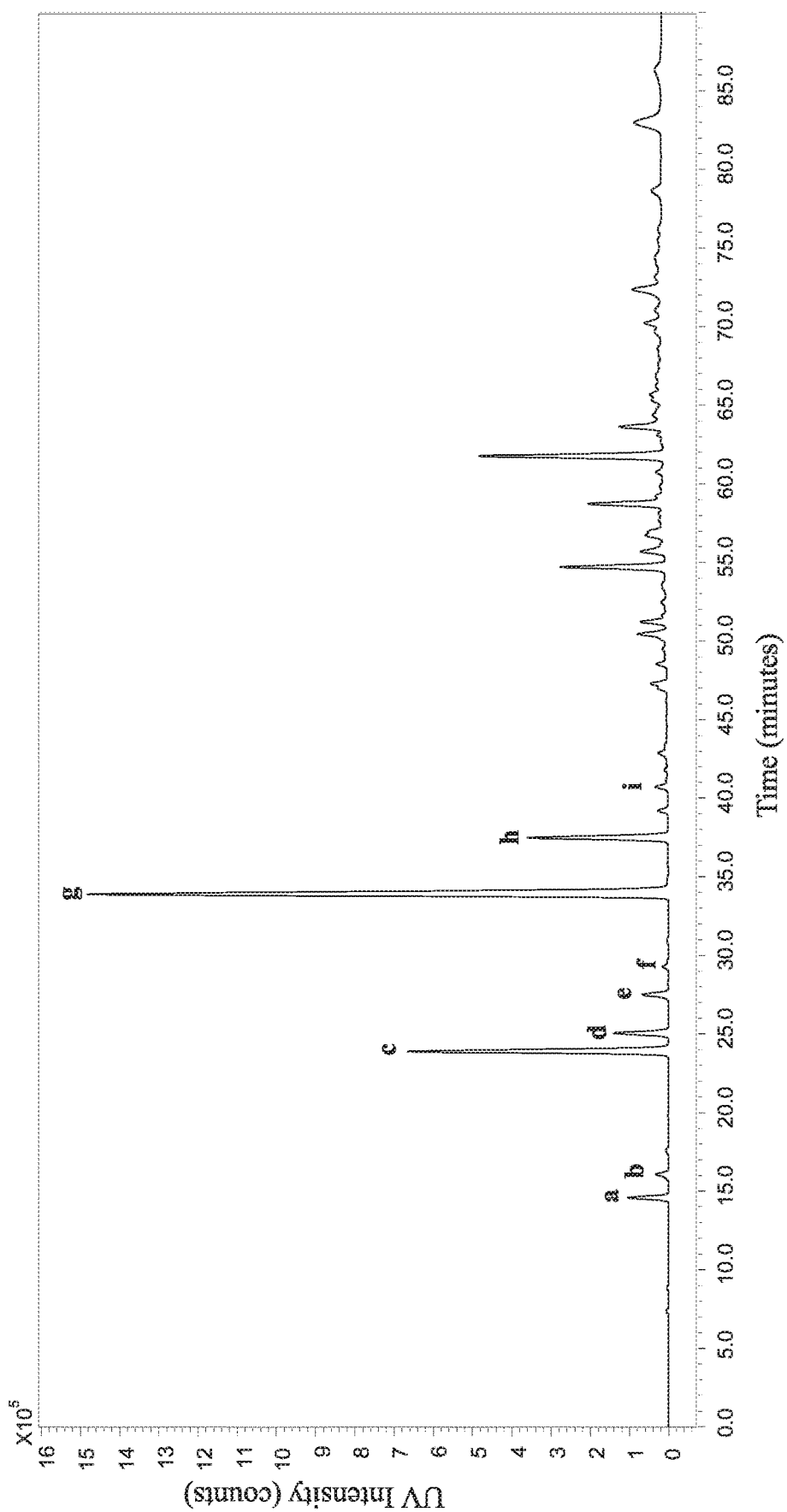
FIG. 3 to FIG. 9 are high performance liquid chromatography (HPLC) chromatograms of the melamine-formaldehyde resin compositions of Examples 1 to 7.
Figure 4:
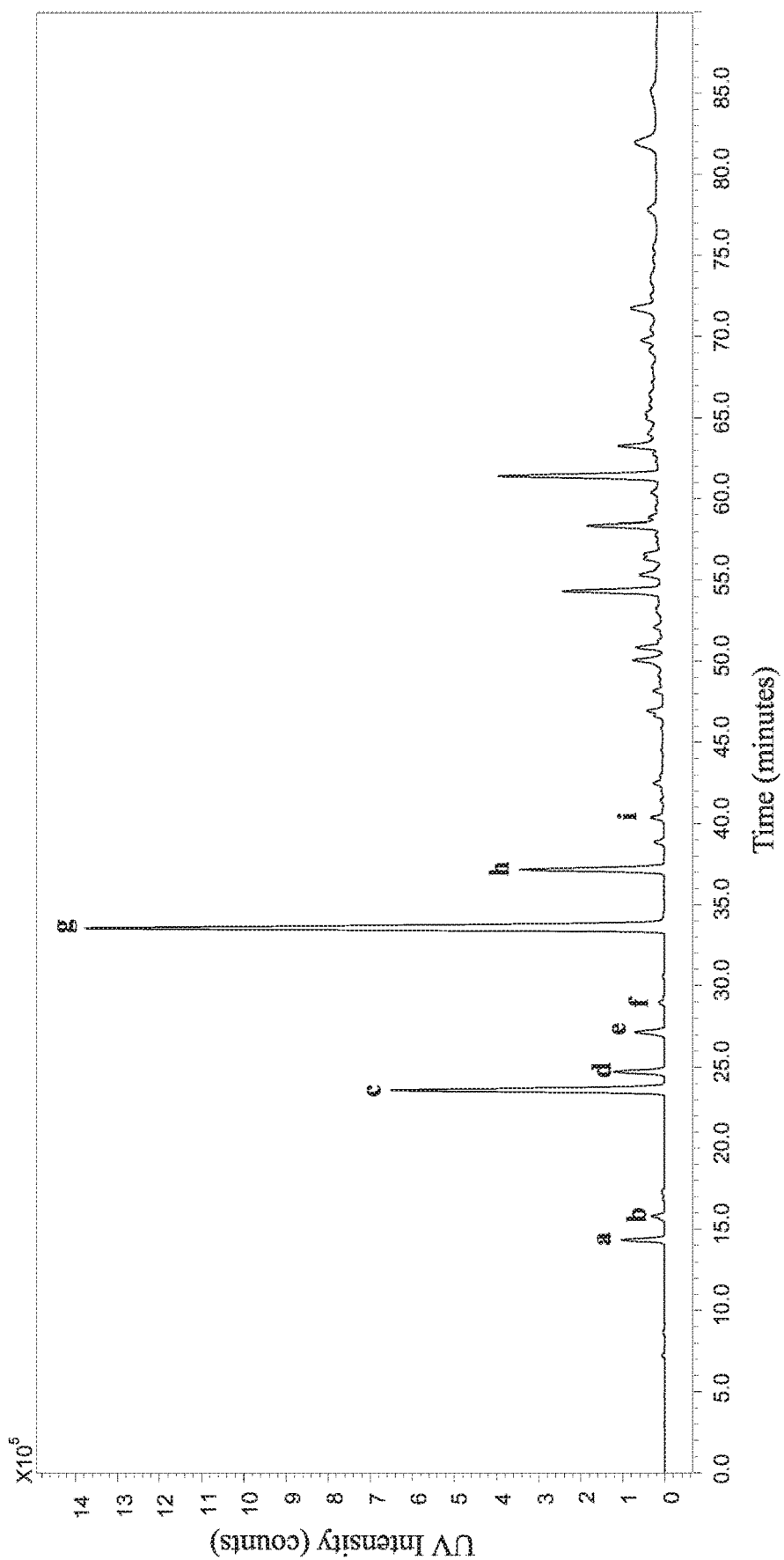
Figure 5:
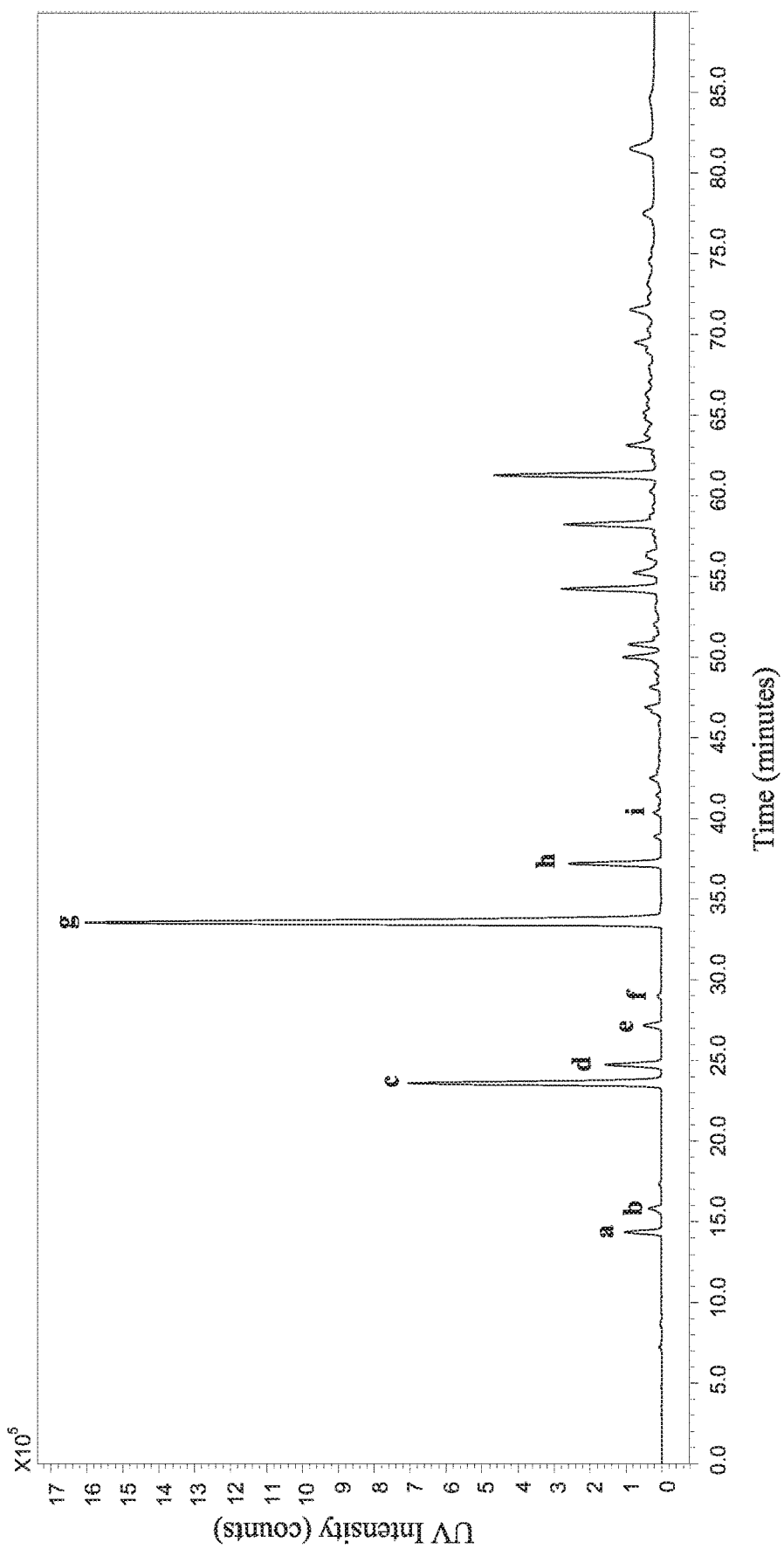
Figure 6:
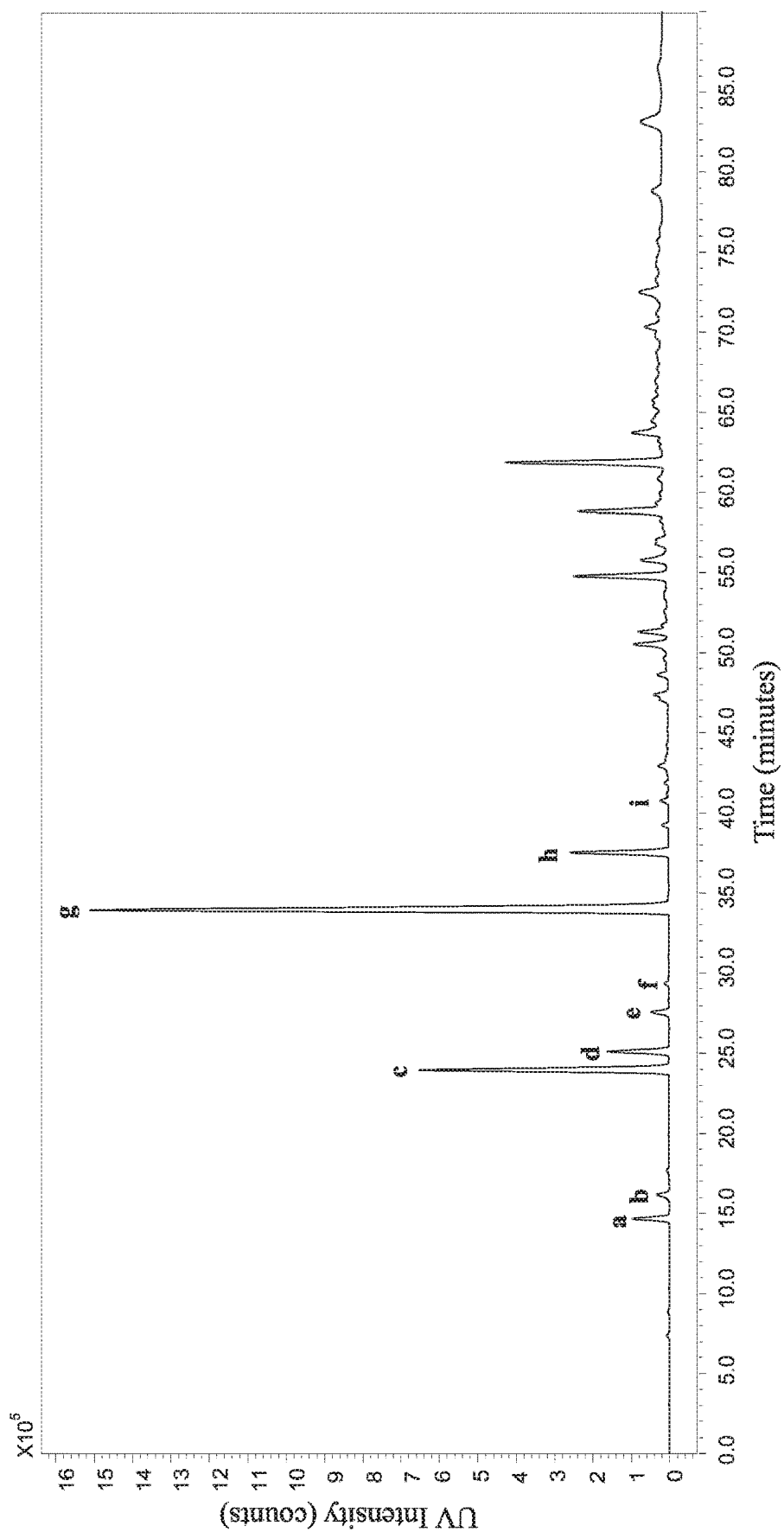
Figure 7:
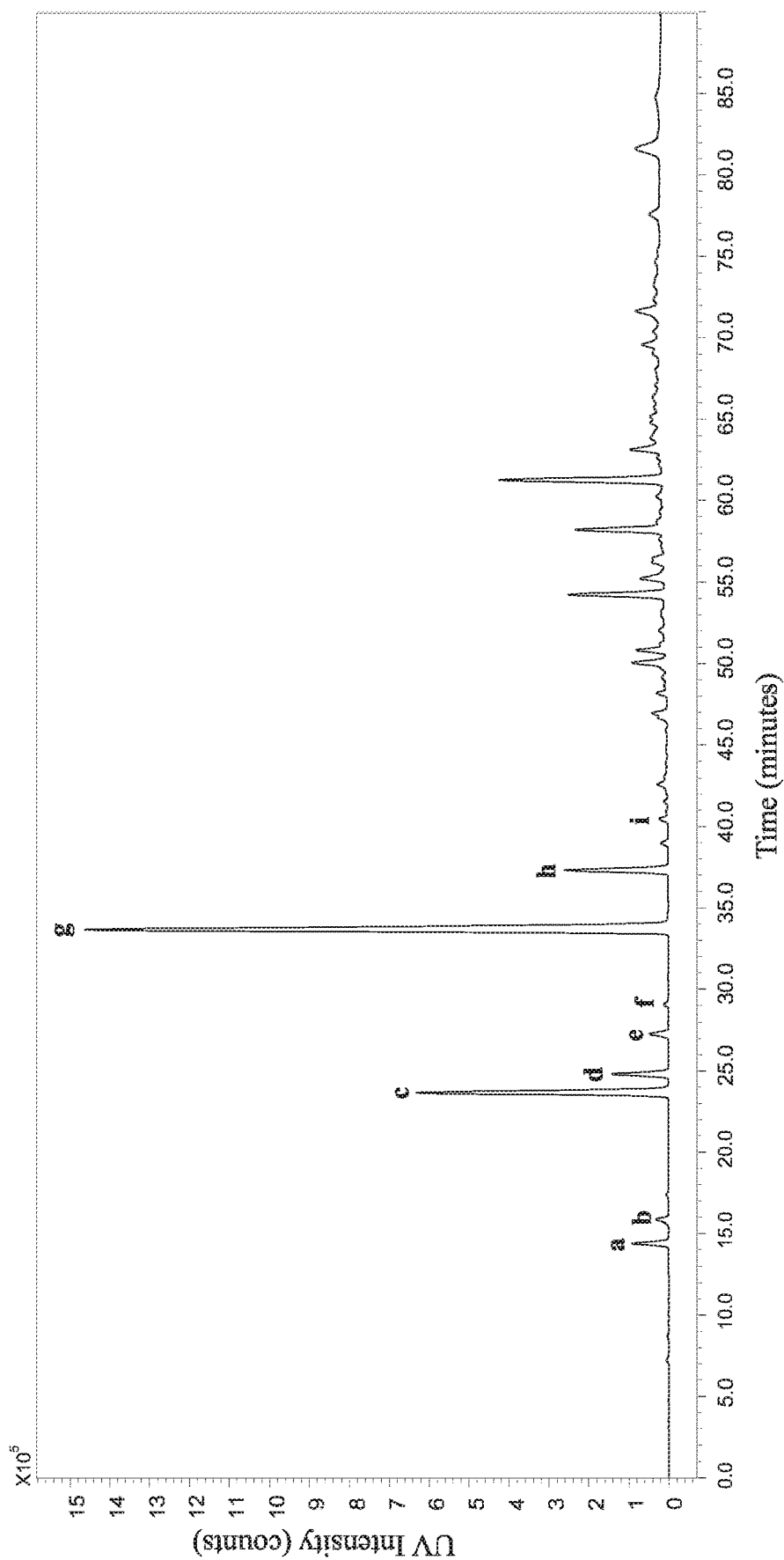
Figure 8:
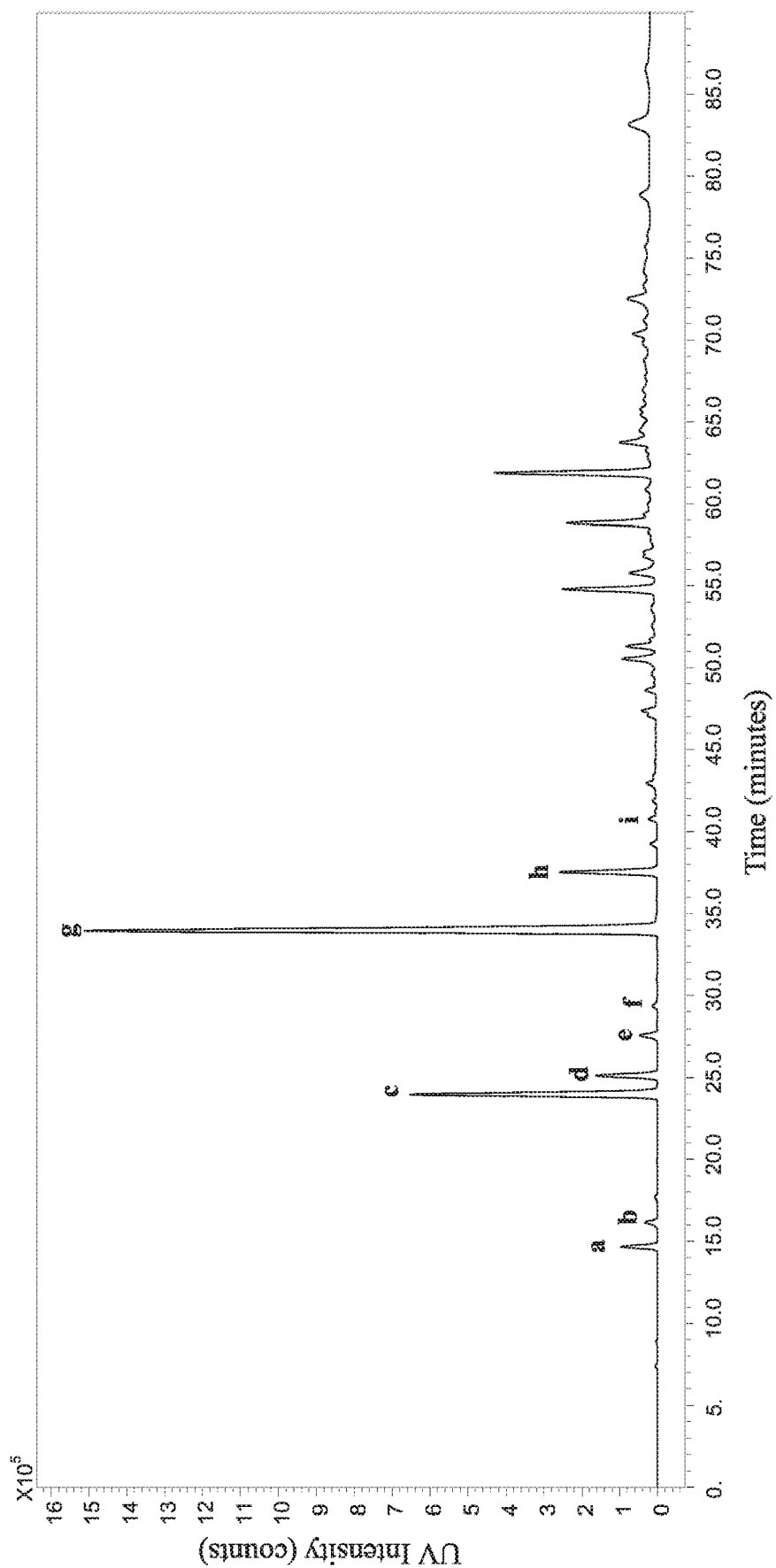
Figure 9:
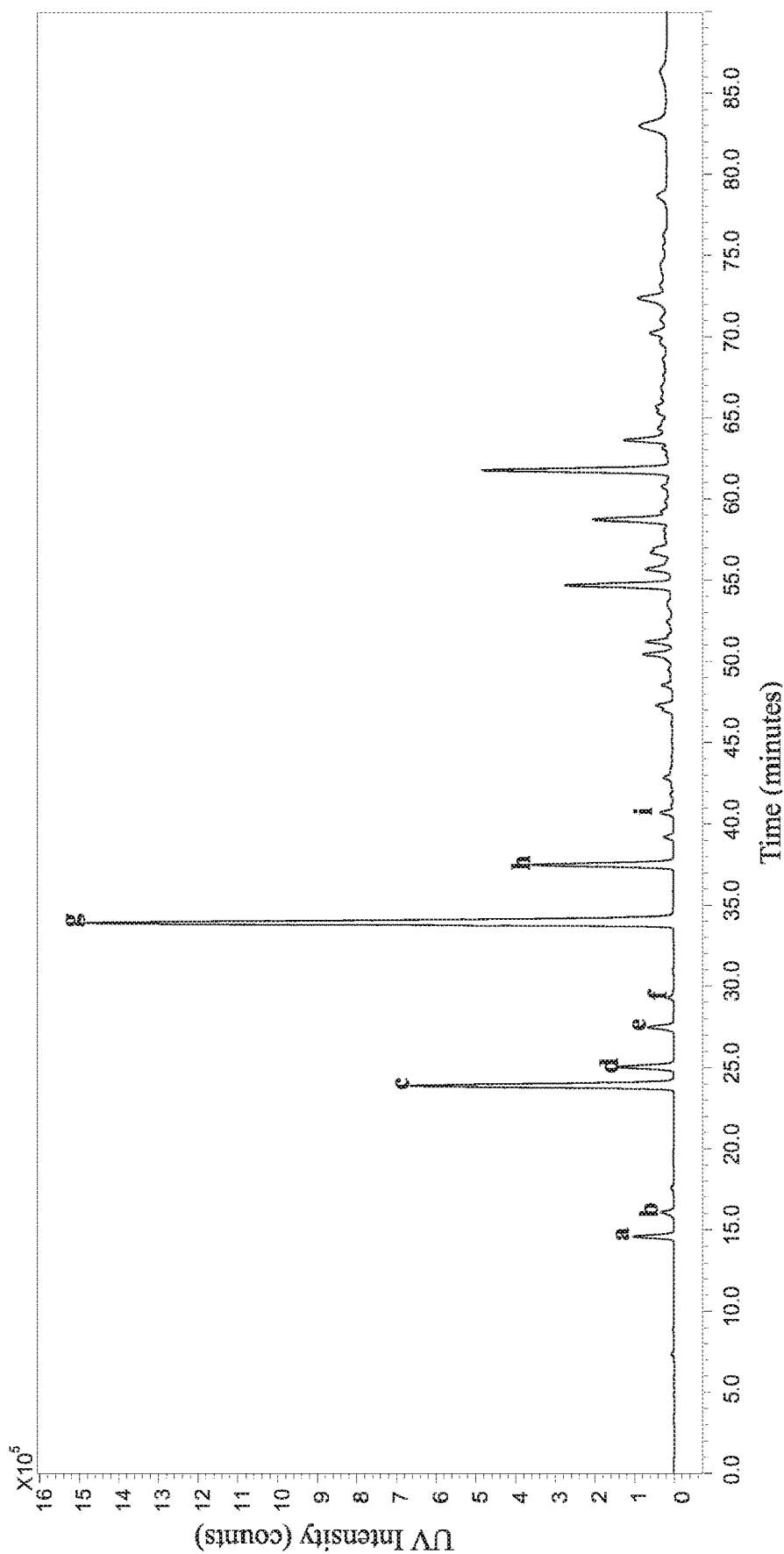
Figure 10:
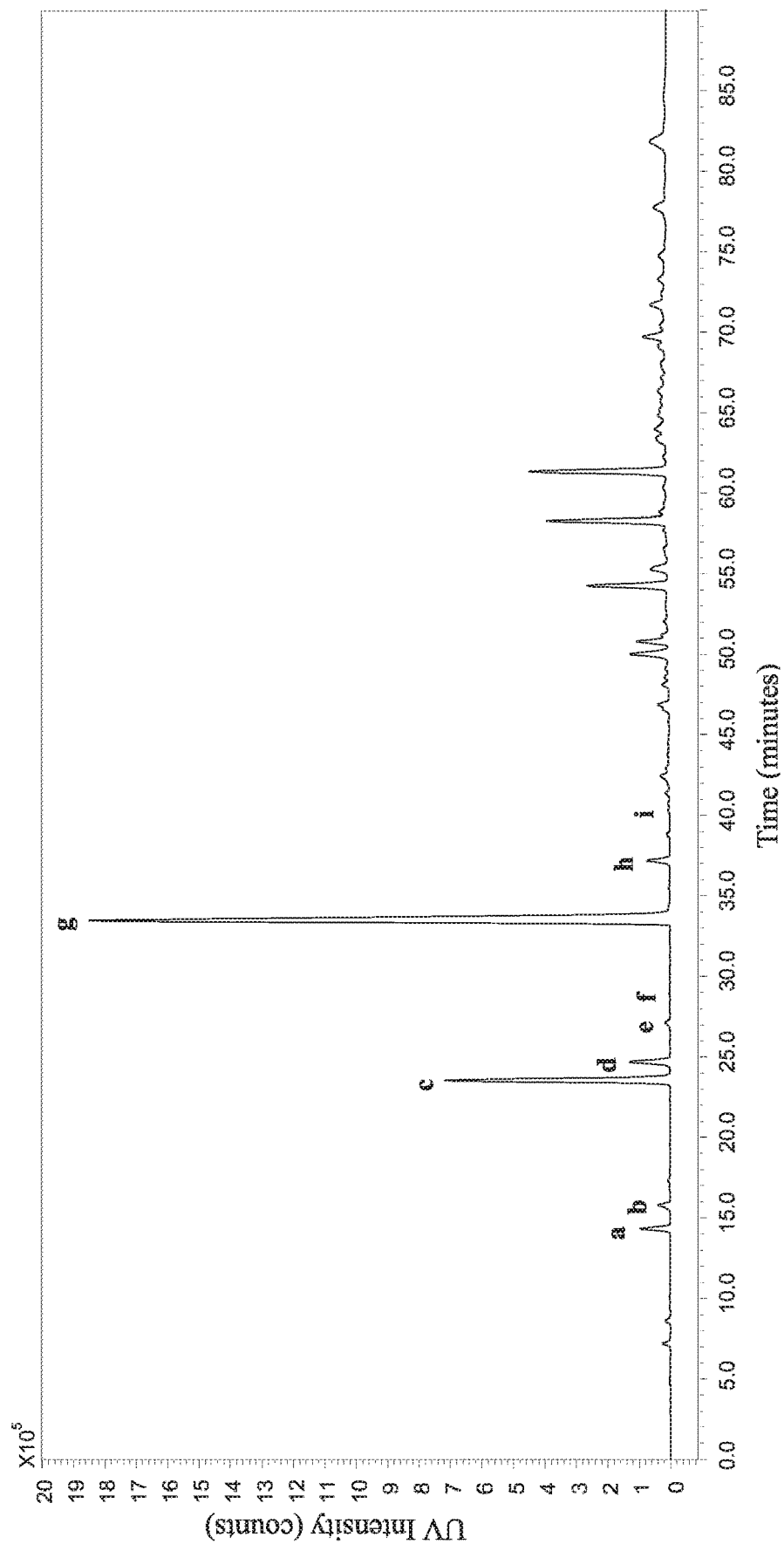
FIG. 10 to FIG. 12 are HPLC chromatograms of the melamine-formaldehyde resin compositions of Comparative Examples 1 to 3.
Figure 11:
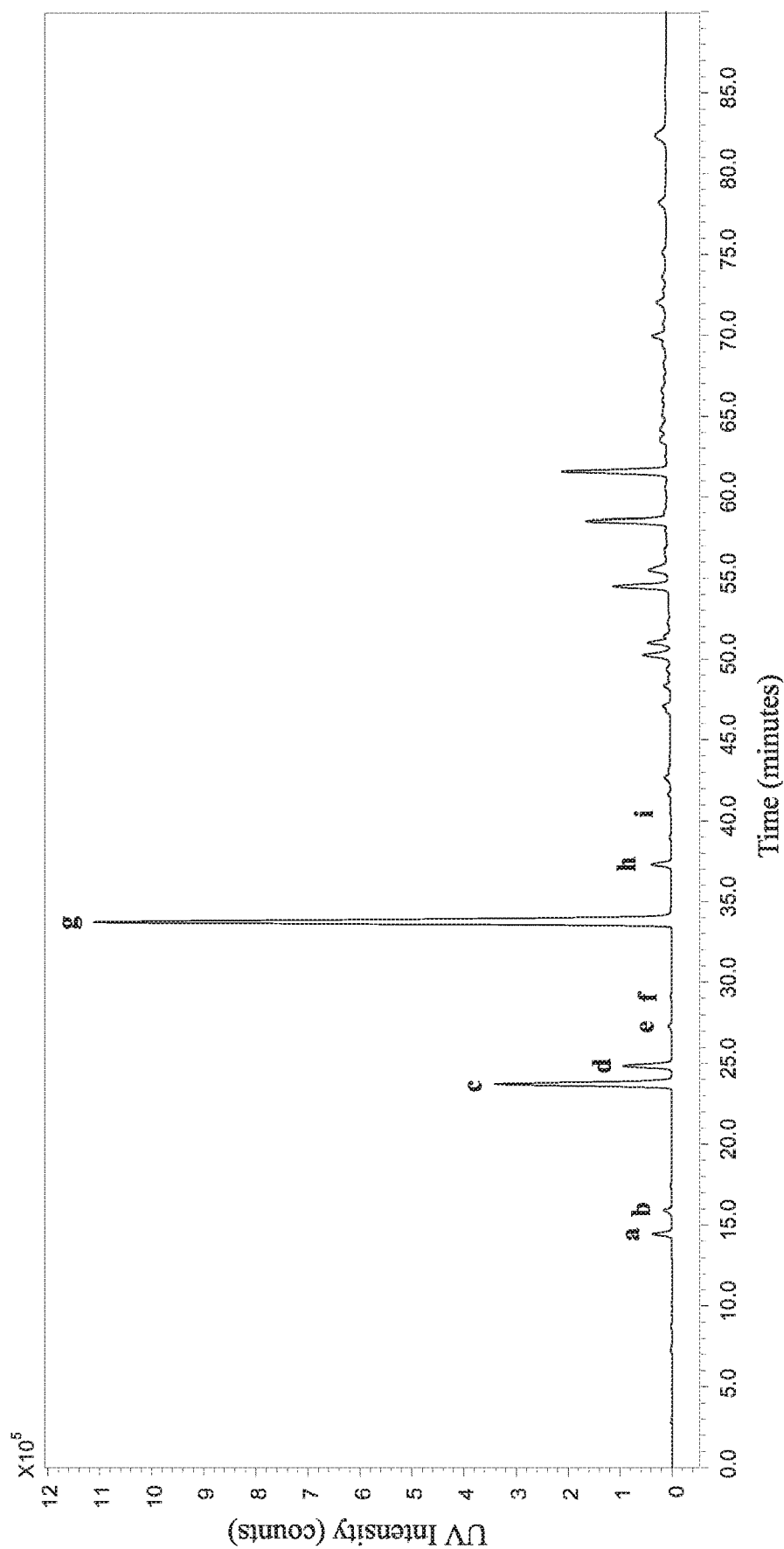
Figure 12:
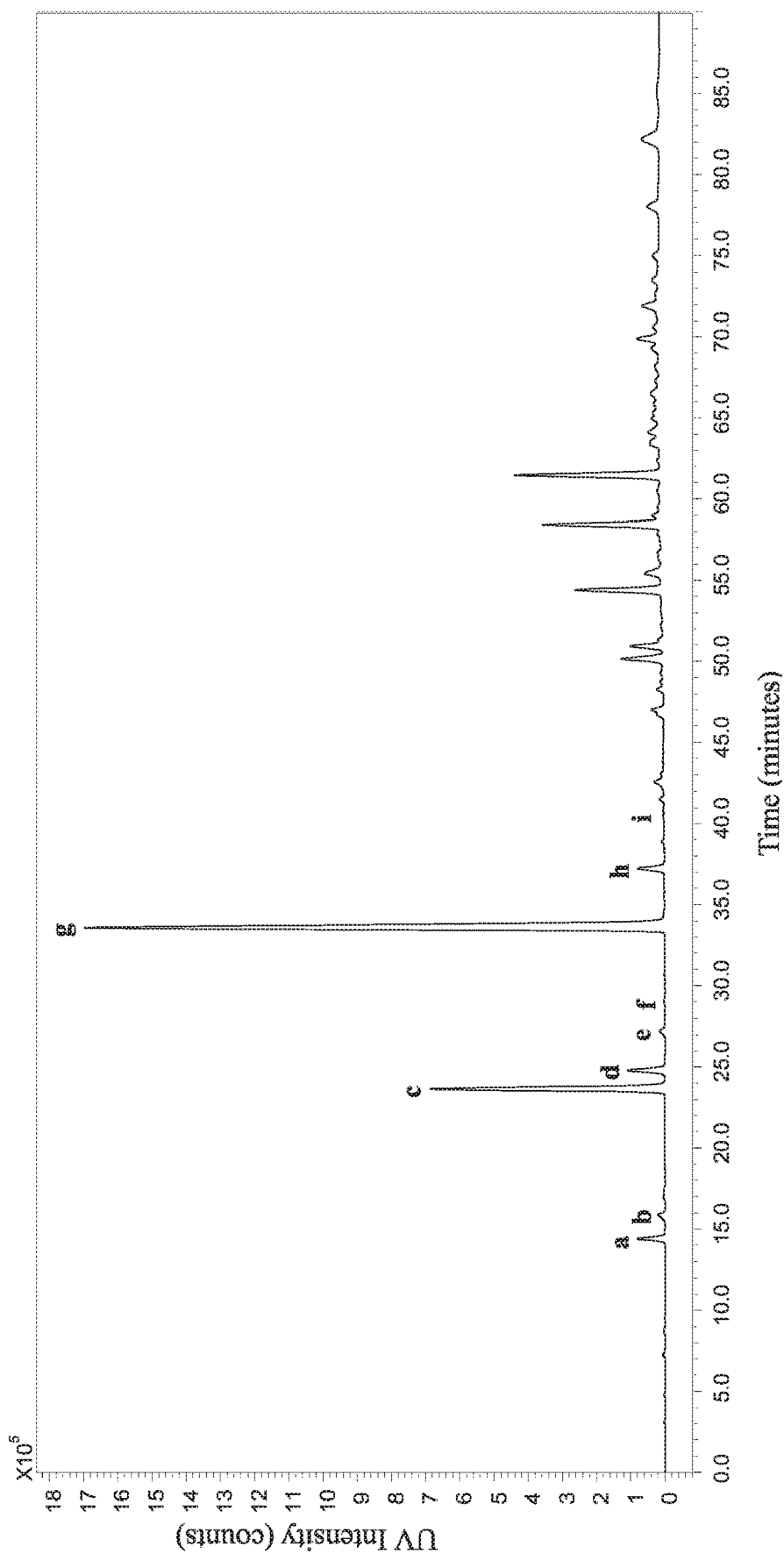

As shown in FIG. 2, the melamine-formaldehyde resin compositions of Comparative Examples 1 to 3 were prepared as follows.

First, 367.2 g of hexamethylol melamine (HMM) was weighed, and 413.3 g of methanol was added. The HMM was stirred to be dissolved, and a mixed solution was obtained.

After that, the mixed solution was processed with etherification for a period of time indicated in Table 1 below. Upon completing the etherification, the mixed solution was distilled under 760 torr and 98° C. and then distilled under reduced pressure of 80 torr and 115° C.

Subsequently, 413.3 g of methanol was added to the mixed solution in which the pH value thereof was adjusted to 3.0±0.5 by the addition of hydrochloric acid. The mixed solution was heated to 69±1° C. and maintained for 20 minutes. Then, the pH value of the mixed solution was adjusted to 9.5±0.5 by adding sodium hydroxide.

Thereafter, the mixed solution was distilled under 760 torr and 98° C. and then distilled under reduced pressure of 80 torr and 140° C. After 60 minutes, the solid residue was filtered to obtain the melamine-formaldehyde resin compositions of Comparative Examples 1 to 3.

Test Example 1: High Performance Liquid Chromatography-Mass Spectroscopy (HPLC-MS) Analysis In this test example, the melamine-formaldehyde resin compositions of Examples 1 to 7 and Comparative Examples 1 to 3 were used as test samples, which were analyzed by High Performance Liquid Chromatography (HPLC) coupled with Mass Spectrometry (MS) under the following conditions to respectively clarify components and area ratios thereof in the melamine-formaldehyde resin compositions of Examples 1 to 7 and Comparative Examples 1 to 3.

The parameters of HPLC:
1. Brand: SHIMADZU;
2. System Controller: SCL-20A;
3. Autoinjector: SCL-20A;
4. Pump: LC-20AT;
5. Detector: UV/Vis SPD-20A;
6. Detective Wavelength: 235 nanometers (nm);
7. Column: Inertsil ODS-2 (inner diameter: 4.6 millimeters (mm), length: 250 mm; particle size: 5 micrometers (μm))

8. Mobile Phase:
(1) 0 minute to 60 minutes: gradient elution with methanol: water from 30:70 gradually increasing to 70:30 (volume percentage), and
(2) 60 minutes to 90 minutes: isocratic elution with methanol: water of 70:30 (volume percentage);
9. Mobile Phase Velocity: 1 milliliter per minute (mL/min).

The parameters of MS:
1. Brand and Model: SHIMADZU LCMS-8045;
2. Ionization Source: Electrospray Ionization (ESI);
3. Nebulizing Gas Flow: 3 liters per minute (L/min);
4. Heating Gas Flow: 10 L/min;
5. Interface Temperature: 300° C.;
6. DL Temperature: 250° C.;
7. Heat Block Temperature: 400° C.;
8. Drying Gas Flow: 10 L/min;
9. Mass Analyzer: Triple-Quadrupole (QqQ).

FIG. 3 to FIG. 12 are HPLC chromatograms of the melamine-formaldehyde resin compositions of Examples 1 to 7 (S1 to S7) and Comparative Examples 1 to 3 (C1 to C3), which were obtained according to the above-mentioned method. The area ratio of each of the chromatographic peaks in each of the HPLC chromatograms was shown in Table 1 below.

Herein, the area of each of the chromatographic peaks in each of the HPLC chromatograms was identified by a computer. If the width of the signal along the x-axis in an HPLC chromatogram was less than 5 seconds and the UV intensity of the signal was less than 200 per minute, the signal was determined as a noise.

In addition, the mass-to-charge ratio (m/z) of each of the collected fractions under different retention times was analyzed by a mass spectrometer and indicated in Table 1 below. The specific component corresponding to each of the fractions is indicated in FIG. 3 to FIG. 12. The melamine-formaldehyde resin composition includes at least the following components:

Component a

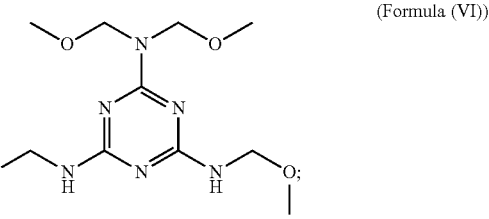

(Formula (VI))

Component b

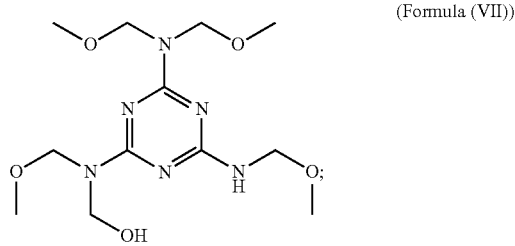

(Formula (VII))

-continued

Component c

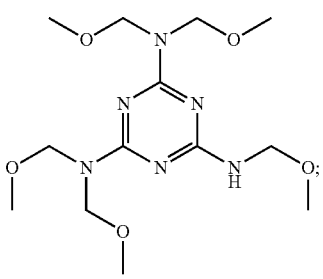
(Formula (IX))

Component d

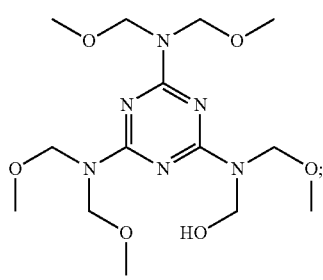
(Formula (X))

Component e

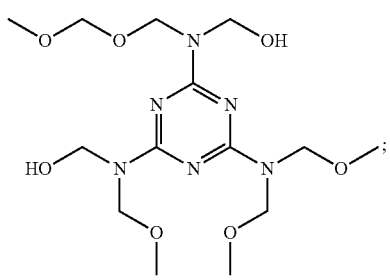
(Formula (II))

Component f

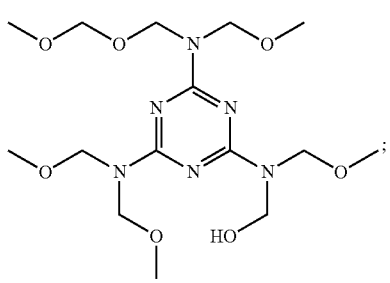
(Formula (III))

Component g

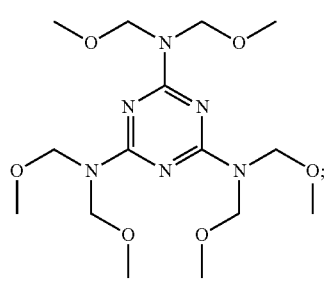
(Formula (VIII))

-continued

Component h

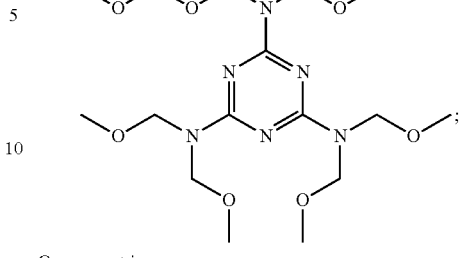
(Formula (IV))

Component i

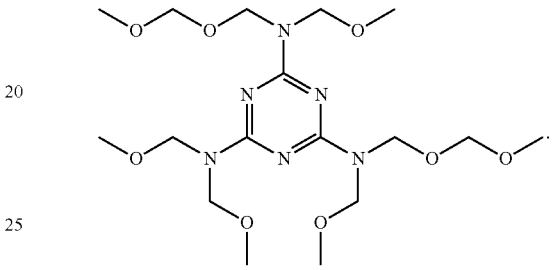
(Formula (V))

Test Example 2: Freeze Resistance

In this test example, the melamine-formaldehyde resin compositions of Examples 1 to 7 and Comparative Examples 1 to 3 were used as test samples. 10 mL of each of the test samples were sampled and respectively put in a 20-mL sample bottle. All the sample bottles were kept still at room temperature for about an hour to ensure that there was no air bubble present in the sample bottles.

Next, all the sample bottles were stored in a −15° C. refrigerator (low-temperature environment). Each of the test samples was examined whether crystals appeared on the liquid surface or on the wall of the sample bottle at the same time on the next day (the $2^{nd}$ day). If crystals were observed on the $2^{nd}$ day for a test sample that had been stored in the low-temperature environment, it meant the low-temperature storage life of the test sample was less than one day, which was indicated as "<1 day." If crystals were not observed on the $2^{nd}$ day, it meant the test sample could resist freezing for at least one day. After recording the duration of freeze resistance, the test sample was put back to the −15° C. refrigerator and reexamined on the next day (the $3^{rd}$ day). If crystals were not observed on the $2^{nd}$ day but were observed on the $3^{rd}$ day, it meant the low-temperature storage life of the test sample was more than 1 day but less than 2 days, which was indicated as "1 day." If crystals were not observed on the $3^{rd}$ day, it meant the test sample could resist freezing for at least two days. After recording the duration of freeze resistance, the test sample was put back to the −15° C. refrigerator and reexamined on the next day (the $4^{th}$ day). All the test samples were examined day by day in a manner mentioned above. If crystals were not observed on the $15^{th}$ day, it meant the test sample could resist freezing for at least 14 days. The low-temperature storage life of the test sample was recorded as "≥14 days," which meant the test sample could resist freezing for more than two weeks. The low-temperature storage life of each of the test samples was indicated in Table 1 below.

TABLE 1

The etherification time, the area ratios of chromatographic peaks, and the low-temperature storage life of the melamine-formaldehyde resin composition of each of Examples 1 to 7 (S1 to S7) and Comparative Examples 1 to 3 (C1 to C3).

| | | S1 | S2 | S3 | S4 | S5 | S6 | S7 | C1 | C2 | C3 |
|---|---|---|---|---|---|---|---|---|---|---|---|
| | | \multicolumn{10}{c}{Etherification Time (min)} |
| | | 43 | 55 | 42 | 50 | 52 | 45 | 48 | 56 | 50 | 46 |
| Component | m/z | \multicolumn{10}{c}{Area Ratios of Chromatographic Peaks (%)} |
| a | 303 | 1.34 | 1.32 | 1.38 | 1.43 | 1.39 | 1.19 | 2.11 | 1.20 | 1.11 | 1.02 |
| b | 333 | 0.51 | 0.65 | 0.56 | 0.59 | 0.59 | 0.92 | 2.46 | 0.57 | 0.36 | 0.50 |
| c | 347 | 9.70 | 10.39 | 10.27 | 10.84 | 10.67 | 10.42 | 13.17 | 10.03 | 10.50 | 10.30 |
| d | 377 | 2.00 | 3.12 | 2.07 | 2.60 | 2.33 | 4.89 | 8.67 | 1.86 | 1.59 | 2.78 |
| e | 393 | 1.04 | 1.09 | 1.19 | 0.84 | 0.89 | 1.73 | 3.07 | 0.28 | 0.26 | 0.22 |
| f | 407 | 0.23 | 0.39 | 0.25 | 0.24 | 0.23 | 0.91 | 1.98 | 0.05 | 0.04 | 0.06 |
| g | 391 | 26.31 | 29.66 | 27.45 | 30.71 | 30.29 | 28.80 | 20.32 | 34.82 | 33.19 | 39.02 |
| h | 421 | 5.37 | 6.32 | 5.76 | 4.37 | 4.26 | 7.17 | 5.34 | 1.02 | 1.20 | 1.16 |
| i | 451 | 0.49 | 0.62 | 0.55 | 0.37 | 0.37 | 0.75 | 0.68 | 0.07 | 0.07 | 0.05 |
| a + b | — | 1.85 | 1.97 | 1.94 | 2.02 | 1.98 | 2.11 | 4.57 | 1.77 | 1.47 | 1.52 |
| e + f + h + i | — | 7.13 | 8.42 | 7.75 | 5.82 | 5.75 | 10.56 | 11.07 | 1.42 | 1.57 | 1.49 |
| Low-Temperature Storage Life (days) | | ≥14 | ≥14 | ≥14 | 8 | 5 | ≥14 | ≥14 | <1 | 1 | <1 |

Discussion

As shown in Table 1 above, based on the total area of all chromatographic peaks in each of the melamine-formaldehyde resin compositions, the sum of the areas of the chromatographic peaks with m/z of 393 to 692 (e.g. the chromatographic peaks of components e, f, h, and i in each of the melamine-formaldehyde resin compositions of Examples 1 to 7) ranges from 2% to 20%. In contrast, based on the total area of all chromatographic peaks in each of the melamine-formaldehyde resin compositions, the sum of the areas of the chromatographic peaks with m/z of 393 to 692 in each of the melamine-formaldehyde resin compositions of Comparative Examples 1 to 3 is beyond the above-mentioned range, i.e., less than 2%. Comparing the low-temperature storage life of the melamine-formaldehyde resin compositions of Examples 1 to 7 to that of Comparative Examples 1 to 3, the low-temperature storage life of the melamine-formaldehyde resin compositions of Examples 1 to 7 is at least 5 days, and even more than 14 days; however, the low-temperature storage life of the melamine-formaldehyde resin compositions of Comparative Examples 1 to 3 is only 1 day or even less than 1 day. Therefore, the experimental results show that controlling the area ratio of the chromatographic peaks with m/z of 393 to 692 increases the freeze resistance of the melamine-formaldehyde resin composition, resulting in a prolonged low-temperature storage life. In addition, the person skilled in the art could also understand that controlling the area ratio of the chromatographic peaks of other components similar to components e, f, h, and i in the melamine-formaldehyde resin composition could also improve the freeze resistance and prolong the storage life in low-temperature environments of the melamine-formaldehyde resin composition.

The experimental results in Table 1 are analyzed from another perspective. Based on the total area of all chromatographic peaks in each of the melamine-formaldehyde resin compositions, the area of the chromatographic peak of component g (2,4,6-tri[bis(methoxymethyl)amino]-1,3,5-triazine) in each of the melamine-formaldehyde resin compositions of Examples 1 to 7 is less than 33%, while the area of the chromatographic peak of component g in each of the melamine-formaldehyde resin compositions of Comparative Examples 1 to 3 is more than 33%. Comparing the low-temperature storage life of the melamine-formaldehyde resin compositions of Examples 1 to 7 to that of Comparative Examples 1 to 3, the low-temperature storage life of the melamine-formaldehyde resin compositions of Examples 1 to 7 is at least 5 days, wherein each of Examples 1 to 3 and 6 to 7 has a low-temperature storage life of even more than 14 days; however, the low-temperature storage life of the melamine-formaldehyde resin compositions of Comparative Examples 1 to 3 is only 1 day or even less than 1 day. The experimental results show that controlling the area ratio of the chromatographic peak of component g would suppress or reduce crystal formation, thereby improving the freeze resistance and prolonging the storage life in low-temperature environments of the melamine-formaldehyde resin composition.

In addition, the components of each of the melamine-formaldehyde resin compositions of Examples 1 to 7 are further analyzed. It is observed that controlling the sum of the area ratios of the chromatographic peak with m/z of 300 to 310 (e.g. the chromatographic peak of component a) and the chromatographic peak with m/z of 330 to 340 (e.g. the chromatographic peak of component b) to be more than 1.80% could increase the freeze resistance of the melamine-formaldehyde resin composition, so that the low-temperature storage life thereof is at least 5 days.

In summary, by controlling the area ratio of the chromatographic peak of the specific component in the melamine-formaldehyde resin composition, e.g. controlling the area ratios of the chromatographic peaks of the melamine oligomers (components e, f, h, and i) or controlling the area ratio of chromatographic peak of 2,4,6-tri[bis(methoxymethyl)amino]-1,3,5-triazine (component g), crystal formation in the melamine-formaldehyde resin composition could be effectively suppressed and freeze resistance of the melamine-formaldehyde resin composition could be improved, thereby increasing the low-temperature storage life and the range of application of the melamine-formaldehyde resin composition.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A melamine-formaldehyde resin composition, comprising at least one melamine oligomer;
   wherein the melamine-formaldehyde resin composition is analyzed by Liquid Chromatography-Mass Spectrometry (LC-MS), obtaining that the mass-to-charge ratio (m/z) of the at least one melamine oligomer ranges from 393 to 692;
   wherein based on the total area of all chromatographic peaks in the melamine-formaldehyde resin composition, the sum of the areas of the chromatographic peaks with m/z of 393 to 692 ranges from 2% to 20%.

2. The melamine-formaldehyde resin composition as claimed in claim 1, wherein the at least one melamine oligomer has structure(s) represented by the following Formula (I):

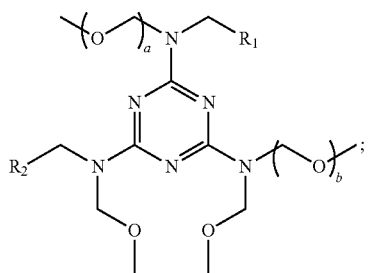

Formula (I)

wherein a is an integer from 2 to 6, b is an integer from 1 to 6, and $R_1$ and $R_2$ are each independently a hydroxyl group or a methoxy group.

3. The melamine-formaldehyde resin composition as claimed in claim 2, wherein the m/z of the at least one melamine oligomer ranges from 393 to 452.

4. The melamine-formaldehyde resin composition as claimed in claim 3, wherein based on the total area of all chromatographic peaks in the melamine-formaldehyde resin composition, the sum of the areas of the chromatographic peaks with m/z of 393 to 452 ranges from 5% to 15%.

5. The melamine-formaldehyde resin composition as claimed in claim 3, wherein based on the total area of all chromatographic peaks in the melamine-formaldehyde resin composition, the sum of the areas of the chromatographic peaks with m/z of 393 to 452 ranges from 7% to 12%.

6. The melamine-formaldehyde resin composition as claimed in claim 3, wherein based on the total area of all chromatographic peaks in the melamine-formaldehyde resin composition, the sum of the areas of the chromatographic peaks with m/z of 393 to 452 ranges from 5% to 8%.

7. The melamine-formaldehyde resin composition as claimed in claim 4, wherein the at least one melamine oligomer has structure(s) represented by the following Formula (II) to Formula (V):

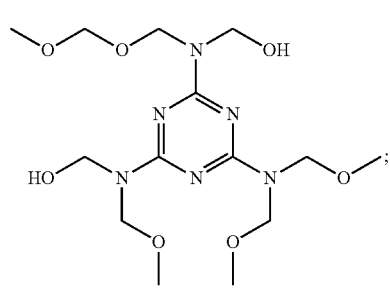

Formula (II)

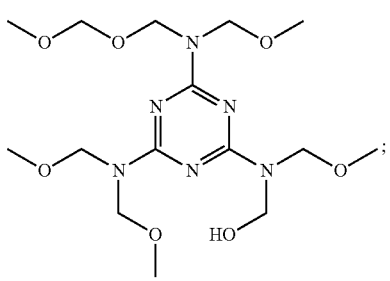

Formula (III)

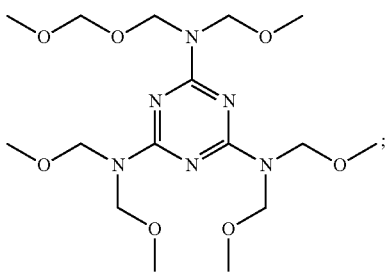

Formula (IV)

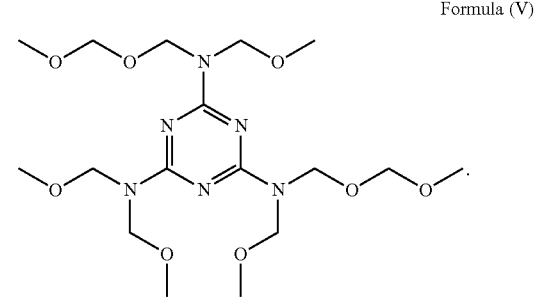

Formula (V)

8. The melamine-formaldehyde resin composition as claimed in claim 1, wherein the melamine-formaldehyde resin composition further comprises a component represented by the following Formula (VI):

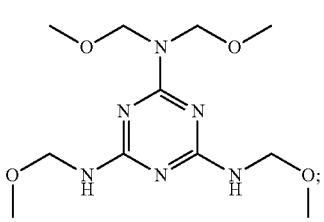

Formula (VI)

wherein the m/z of the component represented by Formula (VI) ranges from 300 to 310, and based on the total area of all chromatographic peaks in the melamine-formaldehyde resin composition, the area of the chromatographic peak with m/z of 300 to 310 ranges from 1.15% to 2.50%.

9. The melamine-formaldehyde resin composition as claimed in claim 8, wherein the melamine-formaldehyde resin composition further comprises a component represented by the following Formula (VII):

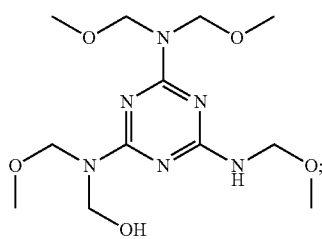

Formula (VII)

wherein the m/z of the component represented by Formula (VII) ranges from 330 to 340, and based on the total area of all chromatographic peaks in the melamine-formaldehyde resin composition, the sum of the areas of the chromatographic peaks with m/z of 300 to 310 and 330 to 340 ranges from 1.8% to 5.0%.

10. A melamine-formaldehyde resin product, which is formed by solidifying the melamine-formaldehyde resin composition as claimed in claim 1.

11. A melamine-formaldehyde resin composition, comprising 2,4,6-tri[bis(methoxymethyl)amino]-1,3,5-triazine represented by the following Formula (VIII):

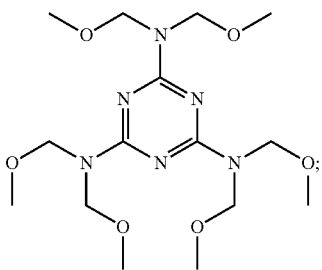

Formula (VIII)

wherein the melamine-formaldehyde resin composition is analyzed by LC-MS, obtaining that based on the total area of all chromatographic peaks in the melamine-formaldehyde resin composition, the area of the chromatographic peak of 2,4,6-tri[bis(methoxymethyl) amino]-1,3,5-triazine ranges from 15% to 33%.

12. The melamine-formaldehyde resin composition as claimed in claim 11, wherein based on the total area of all chromatographic peaks in the melamine-formaldehyde resin composition, the area of the chromatographic peak of 2,4, 6-tri[bis(methoxymethyl)amino]-1,3,5-triazine ranges from 20% to 31%.

13. The melamine-formaldehyde resin composition as claimed in claim 11, wherein based on the total area of all chromatographic peaks in the melamine-formaldehyde resin composition, the area of the chromatographic peak of 2,4, 6-tri[bis(methoxymethyl)amino]-1,3,5-triazine ranges from 20% to 28%.

14. The melamine-formaldehyde resin composition as claimed in claim 11, wherein the melamine-formaldehyde resin composition further comprises at least one melamine oligomer with m/z ranging from 393 to 692, and based on the total area of all chromatographic peaks in the melamine-formaldehyde resin composition, the sum of the areas of the chromatographic peaks with m/z of 393 to 692 ranges from 2% to 20%.

15. The melamine-formaldehyde resin composition as claimed in claim 14, wherein the at least one melamine oligomer has structure(s) represented by the following Formula (I):

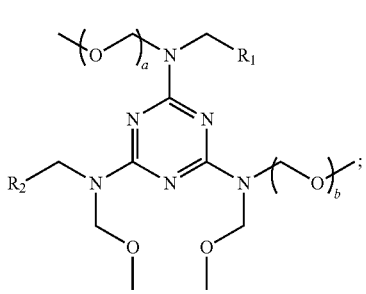

Formula (I)

wherein a is an integer from 2 to 6, b is an integer from 1 to 6, and $R_1$ and $R_2$ are each independently a hydroxyl group or a methoxy group.

16. The melamine-formaldehyde resin composition as claimed in claim 15, wherein the m/z of the at least one melamine oligomer ranges from 393 to 452, and based on the total area of all chromatographic peaks in the melamine-formaldehyde resin composition, the sum of the areas of the chromatographic peaks with m/z of 393 to 452 ranges from 5% to 15%.

17. The melamine-formaldehyde resin composition as claimed in claim 15, wherein the m/z of the at least one melamine oligomer ranges from 393 to 452, and based on the total area of all chromatographic peaks in the melamine-formaldehyde resin composition, the sum of the areas of the chromatographic peaks with m/z of 393 to 452 ranges from 7% to 12%.

18. The melamine-formaldehyde resin composition as claimed in claim 15, wherein the m/z of the at least one melamine oligomer ranges from 393 to 452, and based on the total area of all chromatographic peaks in the melamine-formaldehyde resin composition, the sum of the areas of the chromatographic peaks with m/z of 393 to 452 ranges from 5% to 8%.

19. The melamine-formaldehyde resin composition as claimed in claim 16, wherein the at least one melamine oligomer has structure(s) represented by the following Formula (II) to Formula (V):

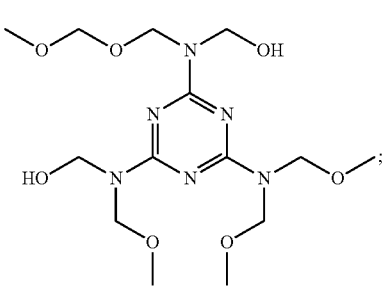

Formula (II)

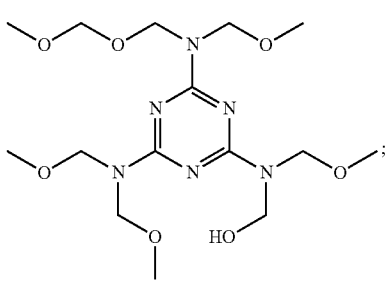

Formula (III)

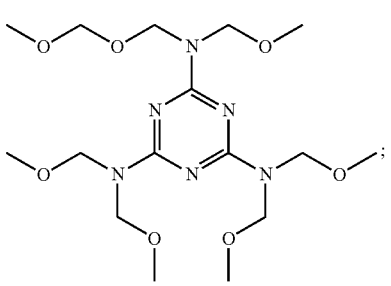

Formula (IV)

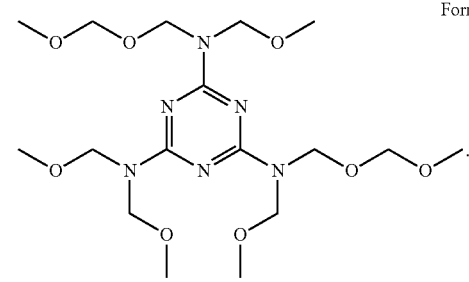

Formula (V)

20. The melamine-formaldehyde resin composition as claimed in claim 11, wherein the melamine-formaldehyde resin composition further comprises a component represented by the following Formula (VI):

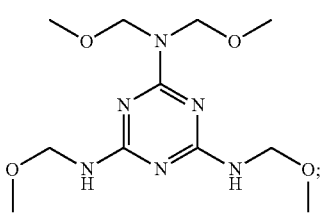

Formula (VI)

wherein the m/z of the component represented by Formula (VI) ranges from 300 to 310, and based on the total area of all chromatographic peaks in the melamine-formaldehyde resin composition, the area of the chromatographic peak with m/z of 300 to 310 ranges from 1.15% to 2.50%.

21. The melamine-formaldehyde resin composition as claimed in claim 20, wherein the melamine-formaldehyde resin composition further comprises a component represented by the following Formula (VII):

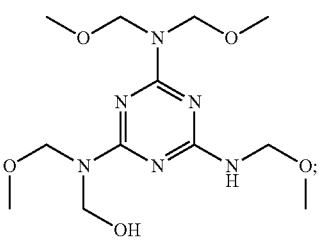

Formula (VII)

wherein the m/z of the component represented by Formula (VII) ranges from 330 to 340, and based on the total area of all chromatographic peaks in the melamine-formaldehyde resin composition, the sum of the areas of the chromatographic peaks with m/z of 300 to 310 and 330 to 340 ranges from 1.8% to 5.0%.

22. A melamine-formaldehyde resin product, which is formed by solidifying the melamine-formaldehyde resin composition as claimed in claim 11.

* * * * *